US012286952B1

(12) United States Patent
Zheng et al.

(10) Patent No.: US 12,286,952 B1
(45) Date of Patent: Apr. 29, 2025

(54) HIGH-ENERGY REMOTE CHAMBER IGNITION SYSTEM

(71) Applicant: Ming Zheng, Windsor (CA)

(72) Inventors: Ming Zheng, Windsor (CA); Xiao Yu, Windsor (CA)

(73) Assignee: Ming Zheng, Windsor (CA)

( * ) Notice: Subject to any disclaimer, the term of this patent is extended or adjusted under 35 U.S.C. 154(b) by 0 days.

(21) Appl. No.: 18/542,969

(22) Filed: Dec. 18, 2023

(51) Int. Cl.
*F02P 5/00* (2006.01)
*F02B 19/12* (2006.01)
*F02P 5/145* (2006.01)
*F02P 9/00* (2006.01)
*F02P 13/00* (2006.01)
*F02P 15/02* (2006.01)

(52) U.S. Cl.
CPC .............. *F02P 5/145* (2013.01); *F02B 19/12* (2013.01); *F02P 9/007* (2013.01); *F02P 13/00* (2013.01); *F02P 15/02* (2013.01)

(58) Field of Classification Search
CPC . F02B 19/08; F02B 19/12; F02P 5/145; F02P 9/007; F02P 13/00; F02P 15/02
See application file for complete search history.

(56) References Cited

U.S. PATENT DOCUMENTS 5,855,827 A 1/1999 Bussing et al.
6,062,018 A * 5/2000 Bussing .................. F02K 7/075 60/39.181
7,669,405 B2 * 3/2010 Pinard ....................... F23R 7/00 60/39.38
7,758,334 B2 * 7/2010 Shimo ....................... F02K 7/04 60/39.77
8,650,856 B2 * 2/2014 Brumberg ................. F02C 5/11 60/39.38
10,337,397 B2 7/2019 Shelby et al.
(Continued)

FOREIGN PATENT DOCUMENTS

JP 4729947 B2 7/2011

OTHER PUBLICATIONS

Biswas et al., Numerical Investigation of Ignition of Ultra-Lean Premixed H2/Air Mixtures by Pre-Chamber Supersonic Hot Jet, SAE Int. J. Engines / vol. 10, Issue 5, Dec. 2017, pp. 1-17.

*Primary Examiner* — Hung Q Nguyen
*Assistant Examiner* — Sherman D Manley
(74) *Attorney, Agent, or Firm* — Aventum IP Law LLP

(57) ABSTRACT

An ignition method is provided for an internal combustion engine having an engine cylinder and a remote ignition chamber in fluid communication with the main combustion chamber via a tubing assembly. The remote ignition chamber and tube are charged with a first combustible charge gas. The main combustion chamber is charged with a second combustible charge gas. A plurality of high-voltage electrodes arranged along the tube are used to pretreat the first combustible charge gas to generate radicals therein. The pretreated first combustible charge gas is ignited to produce a deflagration flame. A plurality of high-energy discharge sparkplugs arranged along the tube are used to sense a property of the deflagration flame. When the sensed property of the deflagration flame is within predetermined threshold limits, at least one of the high-energy discharge sparkplugs is used to provide a transient high energy spark to the deflagration flame to stimulate deflagration-to-detonation transition.

11 Claims, 16 Drawing Sheets

(56) References Cited

U.S. PATENT DOCUMENTS

| | | | | |
|---|---|---|---|---|
| 11,661,885 | B2 * | 5/2023 | Zhou | F02D 41/40 123/144 |
| 2003/0182927 | A1 * | 10/2003 | Leyva | F02K 7/02 60/39.76 |
| 2007/0137172 | A1 * | 6/2007 | Rasheed | F23R 3/16 60/39.821 |
| 2008/0229756 | A1 * | 9/2008 | Pinard | F02K 7/02 60/776 |
| 2009/0320439 | A1 * | 12/2009 | Chapin | F23J 3/023 60/39.38 |
| 2011/0005420 | A1 * | 1/2011 | Fullerton | F42D 3/06 102/202.7 |
| 2011/0047962 | A1 * | 3/2011 | Kenyon | F23C 15/00 60/247 |
| 2013/0025256 | A1 * | 1/2013 | Lu | F02C 5/10 60/204 |
| 2013/0139486 | A1 * | 6/2013 | Kenyon | F23R 7/00 60/39.76 |
| 2013/0139487 | A1 * | 6/2013 | Kenyon | F02K 7/02 60/39.76 |
| 2020/0070961 | A1 * | 3/2020 | Rathay | F23R 7/00 |
| 2020/0072174 | A1 * | 3/2020 | Rathay | F02M 53/06 |
| 2020/0378605 | A1 * | 12/2020 | Lacoste | F02C 5/00 |
| 2023/0040984 | A1 * | 2/2023 | Zhou | F02P 5/045 |

* cited by examiner

HIGH-ENERGY REMOTE CHAMBER IGNITION SYSTEM

FIELD OF THE INVENTION

The present disclosure relates generally to ignition systems for engines, including gas turbine engines and internal combustion engines, and more particularly to a high-energy remote chamber ignition system.

BACKGROUND

Combustion processes are expected to be the dominant technology used for generating the energy that is needed to power the world's economic and transportation infrastructure for the foreseeable future. It is well known that the emissions from such processes can be harmful to the environment, both on a local scale and globally. For instance, the combustion of fossil fuels produces carbon dioxide, which is a so-called greenhouse gas that is known to be responsible for global warming and the climate change associated therewith. Levels of carbon dioxide in the atmosphere have been increasing since the start of the industrial revolution in the 18th century, causing global concern in recent years and prompting industrialized nations to commit to reducing their carbon emissions. Unfortunately, many countries are currently on-track to miss their stated carbon emission reduction targets.

One approach to reducing carbon emissions from combustion processes involves a shift to low-to-zero-carbon fuels, which can significantly reduce or even eliminate entirely such carbon emissions. For example, when natural gas is used instead of coal for power generation, $CO_2$ emissions can be reduced by over 30%. $CO_2$ emission can be further reduced when renewable natural gas (RNG) is used. Of course, combustion processes that use fuels such as hydrogen and ammonia have zero $CO_2$ emission, because the fuels that are being burned do not contain any carbon. However, producing the zero-carbon fuels may require energy that itself produces carbon emissions. For instance, hydrogen may be produced using non-renewable energy sources such as natural gas or coal-fired electricity plants, which do produce carbon emissions. Furthermore, combusting zero-carbon fuels such as hydrogen often produces other harmful pollutants such as NOx.

The challenge in achieving high efficiency, clean combustion of natural gas and ammonia lies in the low chemical reactivities of these two fuels. It is known that the adoption of clean combustion technologies, such as lean burn and inert gas dilution, can significantly reduce combustion temperature, which reduces pollutant emissions for traditional fuels. Unfortunately, for renewable fuels such as natural gas and ammonia, which have low chemical reactivities, achieving complete combustion of the fuel continues to be a challenge.

It therefore follows that an ignition source, capable of supplying sufficient ignition energy to establish a fast and reliable combustion of the air/fuel mixture, is required for the further development of combustion systems that use low carbon or zero carbon renewable fuels with low chemical reactivity, such as renewable natural gas and ammonia fuels.

Several ignition technologies have already been proposed and developed, none of which are completely satisfactory. For instance, a passive pre-chamber ignition system has been developed to generate local turbulence to shorten the combustion duration of the air fuel mixture, leading to higher engine efficiencies. This technique is mostly used in stationary natural gas generators, where in-cylinder turbulence intensity is low because of the lower piston speed. Limited applications are also seen in automotive engines to reduce the combustion duration of the air/fuel mixture.

Active pre-chamber ignition systems can further adjust the air/fuel ratio in the pre-chamber, which is suitable for lean and EGR (exhaust gas recirculation) diluted combustion strategies to further improve engine efficiency. Unfortunately, the potential improvement in combustion efficiency is limited because of the limited volume of the pre-chamber.

Diesel-natural gas dual fuel engines use the autoignition of pilot injection diesel as the ignition source for the natural gas air/fuel mixture. The ignition is normally in the range of ~30 to ~200 J, which is much higher than that of the pre-chamber ignition systems that have been discussed above. Ignition capability is significantly improved, but at the cost of increased soot emission because of the direct-injected diesel fuel.

It would be beneficial to provide a method and apparatus that overcomes at least some of the above-mentioned disadvantages and/or limitations.

SUMMARY OF THE INVENTION

In accordance with an aspect of at least one embodiment there is provided an ignition system for an internal combustion engine having an engine cylinder, the ignition system comprising: a remote ignition chamber enclosing an ignition source; and a tubing assembly, comprising: a tube disposed between the remote ignition chamber and a main combustion chamber defined within the engine cylinder, the tube having a central passageway bounded by a wall and defining a flame propagation pathway between the remote ignition chamber and the main combustion chamber; a plurality of high-voltage electrodes arranged along a length of the tube and extending through the wall of the tube into the central passageway: a plurality of high-energy discharge sparkplugs arranged along the length of the tube and being mounted through the wall of the tube such that a spark gap of each of the high-energy discharge sparkplugs is positioned within the central passageway; and an electronic controller in electrical communication with the plurality of high-voltage electrodes and in electrical communication with the plurality of high-energy discharge sparkplugs, the electronic controller, in use, for providing first control signals for controlling the plurality of high-voltage electrodes for pretreating a combustible charge gas inside the tube prior to combustion thereof, and the electronic controller, in use, for receiving signals relating to properties of a flame propagating within the tube and sensed using the plurality of high-energy discharge sparkplugs, the signals for use in determining spark timing of at least one sparkplug of the plurality of high-energy discharge sparkplugs for stimulating deflagration-to-detonation transition.

In an embodiment there is provided a temperature control layer at least partially surrounding the tube along at least a portion of the length of the tube for controllably varying a temperature of the wall of the tube during use.

In an embodiment there is provided a first injector in fluid communication with the remote chamber for injecting a fuel into the remote chamber, wherein the injected fuel is a first component of the combustible charge gas.

In an embodiment there is provided a second injector in fluid communication with the remote chamber for injecting a gas comprising molecular oxygen into the remote chamber, wherein the injected gas is a second component of the charge gas.

In an embodiment there is provided a valve disposed proximate an end of the tube that opens into the main combustion chamber, the valve being controllably switchable between an open position allowing fluid flow through the valve and a closed position preventing fluid flow through the valve.

In an embodiment there is provided a high voltage power drive in electrical communication with the plurality of high-voltage electrodes and with the electronic controller, wherein the electronic controller provides the first control signals to the high voltage power drive and the high voltage power drive energizes the plurality of high-voltage electrodes in dependence thereon.

In an embodiment the sparkplugs of the plurality of sparkplugs comprise: a first set of two or more spark plugs disposed at a first distance along the length of the tube and circumferentially spaced-apart one from the other, and a second set of two or more spark plugs disposed at a second distance along the length of the tube and circumferentially spaced-apart one from the other.

In an embodiment the sparkplugs of the plurality of sparkplugs are arranged along a spiral path extending along at least a portion of the length of the tube.

In an embodiment there is provided a gas exchange valve disposed within a gas exchange port that is defined through a wall of the remote ignition chamber, the gas exchange port defining one end of a gas exchange conduit that fluidly connects an intake manifold of the engine to the remote ignition chamber.

In an embodiment there is further provided an auxiliary compression cylinder fluidly coupled to the remote ignition chamber and fluidly coupled to the intake manifold of the engine, for equalizing pressure in the remote ignition chamber and in the engine cylinder.

In an embodiment both the gas exchange conduit and the auxiliary compression cylinder are fluidly coupled to a region of the intake manifold that is upstream of a main fuel injector of the internal combustion engine.

In accordance with an aspect of at least one embodiment, there is provided an ignition method for an internal combustion engine having an engine cylinder defining a main combustion chamber and having a remote ignition chamber enclosing an ignition source and being in fluid communication with the main combustion chamber via a tubing assembly having a tube, the method comprising: charging the remote ignition chamber and the tube with a first combustible charge gas; charging the main combustion chamber with a second combustible charge gas: using a plurality of high-voltage electrodes arranged along a length of the tube, pretreating the first combustible charge gas to generate radicals therein: using the ignition source, igniting the pretreated first combustible gas to produce a deflagration flame: using a plurality of high-energy discharge sparkplugs arranged along the length of the tube, sensing a property of the deflagration flame: when the sensed property of the deflagration flame is within predetermined threshold limits, providing a transient high energy spark to the deflagration flame using at least one of the high-energy discharge sparkplugs for stimulating deflagration-to-detonation transition.

In an embodiment the first combustible charge gas has a higher chemical reactivity than the second combustible charge gas.

In an embodiment there is a step of heating the tube to a temperature within a predetermined range of temperatures prior to igniting the pretreated first combustible gas.

In an embodiment charging the remote ignition chamber with the first combustible charge gas comprises injecting a fuel into the remote ignition chamber using a first fuel injector.

In an embodiment charging the remote ignition chamber with the first combustible charge gas further comprises injecting a gas comprising molecular oxygen into the remote ignition chamber using a second fuel injector.

In an embodiment the sensed property is a deflagration flame speed determined based on sensed times of arrival of the deflagration flame at at least two sparkplugs of the plurality of high-energy discharge sparkplugs.

In an embodiment charging the remote ignition chamber and the main combustion chamber occur during an intake stroke of the engine, and further comprising closing a valve disposed along a length of the tube after at least partially charging the remote ignition chamber and the tube with the first combustible charge gas, to prevent fluid flow between the tube and the main combustion chamber during a subsequent compression stroke of the engine.

In an embodiment there is a step of opening the valve prior to igniting the pretreated first combustible charge gas.

In an embodiment the first combustible charge gas and the second combustible charge gas have a same composition.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF EMBODIMENTS OF THE INVENTION

Figure 1:
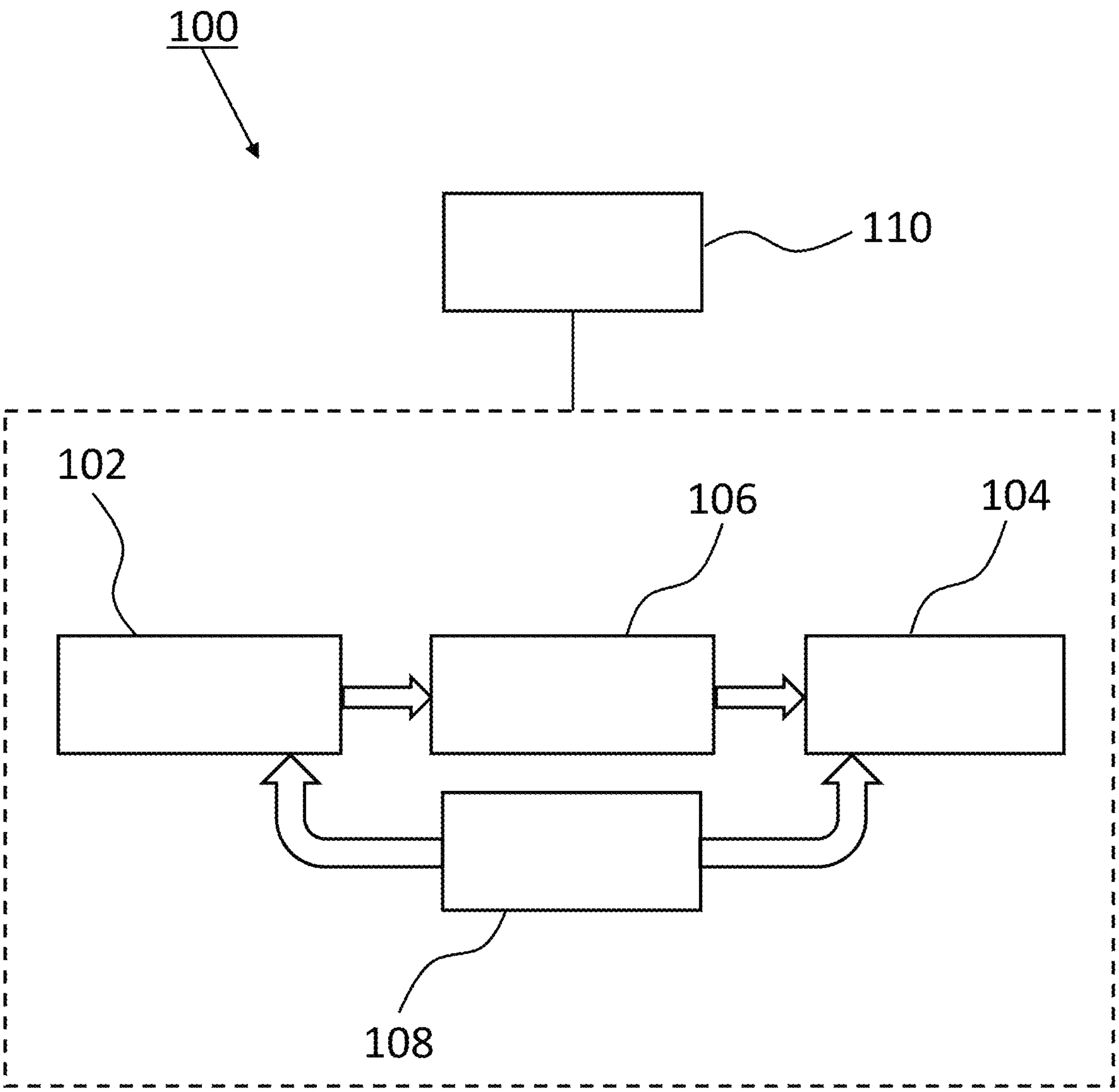
FIG. 1 is a simplified block diagram showing a remote chamber ignition system according to an exemplary embodiment.

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein.

Throughout the disclosure and in the appended claims, the following terms shall be understood to have the following meanings.

The term "low carbon fuel" is defined as a material that contains carbon, but when burned provides thermal energy with fewer carbon-containing emissions than fossil fuels from a well-to-wheel perspective. Some non-limiting examples include natural gas, propane, and biofuels made from plant waste or algae.

The term "zero-carbon fuel" is defined as a material that does not contain carbon, and therefore when burned provides thermal energy with no carbon-containing emissions. Some non-limiting examples include hydrogen and ammonia.

The term "carbon emissions" is defined as the release of carbon compounds into the atmosphere. Carbon emissions have both natural sources and human-made sources. Herein, carbon emissions will refer specifically to the release of carbon compounds that are produced when a material is burned to provide energy.

The terms "renewable natural gas" and "RNG" are defined as a biogas which has been upgraded to a quality similar to fossil natural gas and has a methane concentration of 90% or greater. Renewable natural gas can be distributed via existing natural gas pipelines.

The term "deflagration" is defined as a mode of combustion in which the propagation speed of the combustion wave-front is subsonic. A deflagration wave propagates via the diffusion of heat and mass from a flame zone to effect ignition in the reactants ahead.

The term "detonation" is defined as a mode of combustion in which the propagation speed of the combustion wave-front is supersonic. A supersonic compression shock wave ignites the mixture ahead by adiabatic heating across the leading shock front. The shock is in turn maintained by the backward expansion of the reacting gases and products relative to the front, thus providing the forward thrust needed to drive the shock.

The term "deflagration-to-detonation" is defined as the transition from the deflagration combustion mode to the detonation combustion mode. Thus, deflagration-to-detonation indicates a change or transition in the mechanism of wave propagation rather than simply in a change of wave speed.

The term "hypersonic speed" is defined as one that exceeds five times the speed of sound.

The terms "flame propagation speed" and "speed of propagation of a flame" are used interchangeably herein to refer to the speed at which a combustion wave front is travelling in both the deflagration combustion mode and in the detonation combustion mode. The speed is measured relative to the tube within which the wave front is travelling.

Previous studies have shown that the speed of propagation of a flame, traveling through a tube, can be accelerated with proper matching of the dimension of the tube and the chemical reactivity (stoichiometry) of the air/fuel mixture being combusted. Under the correct conditions, the flame can be accelerated to supersonic speed and transformed into detonation waves. This process of deflagration-to-detonation transition (DDT) has been investigated for various applications, including pulse detonation engines and power generation. Heretofore, most tube-related detonation research has been performed under vacuum conditions, where atmospheric pressure is considered to be "high pressure." Under these conditions, it has been observed that the detonation cell size must be 13 times smaller than the inner diameter of the tube to allow a detonation wave to propagate. Therefore, the inner diameter and volume of detonation tubes that have been used in previous studies are large, making them suitable for applications such as generating power as a stand-alone system but unsuitable for use as an ignition source for internal combustion engines.

Embodiments of the invention provide methods and systems that use transient high energy electric discharge, in combination with pretreatment prior to deflagration, to stimulate the deflagration-to-detonation transition. It has been found that high energy electric discharge alone does not provide sufficient ignition energy to cause "direct initiation" of detonation. This problem is solved using a suitable pretreatment strategy prior to deflagration to modulate the reactivity of the air/fuel mixture, which enhances the flame deflagration speed such that an additional amount of ignition energy provided by a high energy electric discharge is sufficient to stimulate deflagration-to-detonation. The timing of the high energy electric discharge release is important. In particular, according to the disclosed embodiments the energy release is timed to occur directly behind the combustion wave front, when the flame speed exceeds a certain threshold, to further accelerate the combustion wave front along the direction of flame propagation. If the energy release occurs ahead of the flame front, then the flame speed will be decreased. On the other hand, if the energy release occurs after the flame front has passed then there is only a limited impact on the flame propagation speed. As will be discussed in more detail below, the timing of high energy electric discharge is determined using the ion sensors located along the flame propagation path, which can promptly calculate flame speed and the position of the flame front, to allow the energy release to be delivered at the right place and at the right time.

Even if the high energy electric discharge occurs at precisely the right time, the status of the flame, or the velocity of the flame, is critical for determining the DDT stimulation requirements. The lower flame speed is below the detonation speed, the higher the energy demand from the high energy electric discharge to initiate a detonation event. Depending on the flame speed, this may be orders or tens of orders of magnitude higher than the energy an electric spark can provide. On the other hand, if the flame speed is already very close to detonation speed, then even a spark would not be necessary to initiate a detonation event. As will be apparent, the pretreatment strategy must produce a flame speed that is high enough such that a relatively small amount of extra energy, provided by the electric discharge, can transition the flame status from the deflagration to the detonation stage.

The systems and methods disclosed herein provide a deterministic and fast ignition process and remote chamber ignition system, which are suitable for use with multiple applications, such as for instance internal combustion engines, gas turbines, etc., including applications in which fuels with low flame velocities are ignited, such as for instance natural gas or ammonia. For natural gas, which is composed mostly of methane, complete combustion is quite challenging because of the low reactivity of the fuel. For ammonia, which is about seven times "lazier" than natural gas, it is even more challenge to achieve complete combustion. For a deflagration flame, the low speed and low flame temperature make it difficult to overcome the low reactivity of the fuels. In contradistinction, detonation produces extremely high flame speeds and temperatures, making it possible to achieve complete or near complete combustion even using relatively low reactivity fuels such as natural gas and ammonia.

FIG. 1 is a simplified block diagram showing the major components of a remote chamber ignition system 100 according to an embodiment of the invention. A remote chamber 102 is provided in fluid communication with a main combustion chamber 104 via a tubing assembly 106. A gas source 108 is provided in fluid communication with the remote chamber 102 and with the main combustion chamber 104, for providing one or more combustible mixtures (e.g., charge gasses, such as for instance air/fuel mixtures, etc.) thereto. The gas source 108 may include, for instance, one or more fuel injectors for injecting one or more fuels, additional injectors for injecting air, oxygen enriched air, or pure oxygen, etc., into different chambers of the system 100. The gas source 108 may also include various manifolds, conduits, valves, etc. for controlling the flow of gases within the system 100. The gas source 108 may be configured in different ways, as will be discussed in more detail below, to provide a desired mixture of air, fuel, and optionally additional gasses, to the remote chamber 102 and to the main combustion chamber 104. The gas source 108 may be configured such that the combustible mixture that is provided to the main combustion chamber 104 is the same as the combustible mixture that is provided to the remote chamber 102. Alternatively, the gas source 108 may be configured such that the combustible mixture that is provided to the main combustion chamber 104 (i.e., a first charge gas) is different than the combustible mixture that is provided to the remote chamber 102 (i.e., a second charge gas). The combustible mixtures that are provided by the gas source 108 may include a zero-carbon fuel, such as for instance molecular hydrogen or ammonia. The combustible mixtures that are provided by the gas source 108 may include a low carbon fuel, such as for instance natural gas, propane, or a biofuel. In general, the combustible mixtures may include air, or oxygen enriched air, or pure oxygen mixed with a fuel. Of course, various other types of combustible mixtures may be envisaged depending on the requirements of a particular application.

Referring still to FIG. 1, the tubing assembly 106 is configured to cause a rapid transition from deflagration to detonation as a flame propagates from the remote chamber 102 toward the main combustion chamber 104. More particularly, the tubing assembly 106 is configured to perform: i) flame pre-treatment: ii) flame diagnostics; and iii) DDT stimulation, under the control of a controller 110. These processes are described in greater detail below, with reference to FIG. 2.

Figure 2:
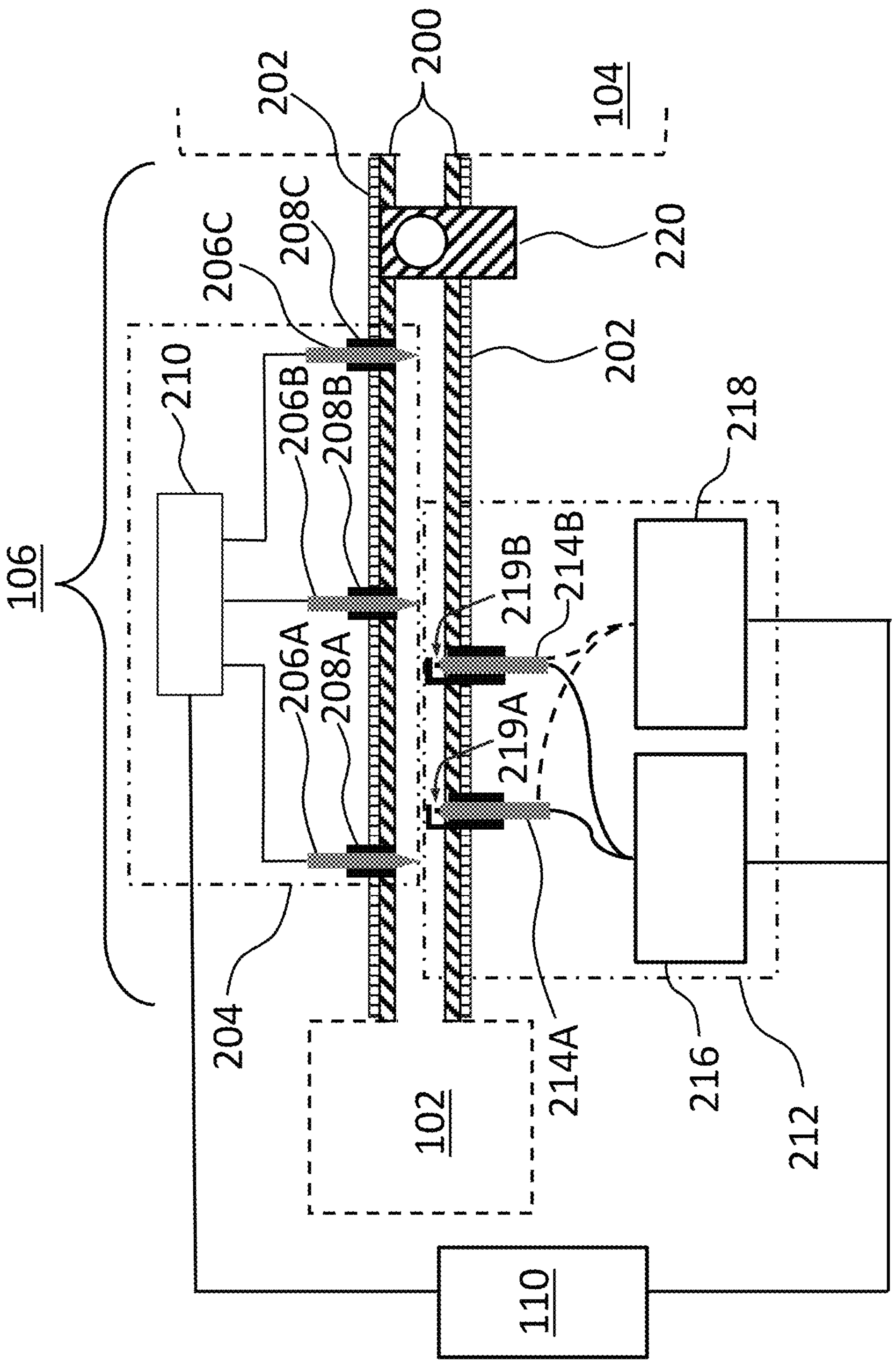
FIG. 2 is a simplified diagram showing an exemplary tubing assembly for use with the system of FIG. 1.

Referring now to FIG. 2, shown is a simplified diagram of an exemplary tubing assembly 106 for use with the system of FIG. 1. The tubing assembly 106 comprises a tube 200, extending between the remote chamber 102 and the main combustion chamber 104. In an embodiment, the remote chamber 102 has a volume of about 5 mL, which can hold about 170 J of energy under about 10 bar pressure. The volume of the tube 200 may be in the range from about 30 mL to about 100 mL. By way of a specific and non-limiting example, the inner diameter of the tube 200 is in the range from about 2 mm to about 25 mm, preferably in the range from about 5 mm to about 12 mm, and most preferably less than about 10 mm. The remote chamber 102 and the tube 200 may be fabricated from a suitable material, such as for instance stainless steel or Inconel.

The small inside diameter of the tube 200 enhances flame speed acceleration, but a low wall-temperature of the tube 200 can contribute to flame quenching. Accordingly, a temperature-control layer 202 is disposed outwardly of the tube 200 to control the wall temperature of the tube 200, under control of the controller 110. The controlled wall temperature of the tube 200 prevents flame speed deacceleration and flame quenching prior to deflagration-to-detonation transition. During operation, the wall temperature of the tube 200 is maintained below a predetermined value to avoid autoignition of the air/fuel mixture inside the tube 200, which would not be synchronized with spark timing for igniting the air/fuel mixture in the main combustion chamber 104. In one specific example, the temperature of the temperature-control layer 202 is controlled using an electric heating element. In another specific example, the temperature of the temperature-control layer 202 is controlled using engine coolant via a heat exchanger.

Referring still to FIG. 2, a high-voltage electrode assembly 204 is provided for pre-treating the unburned air/fuel mixture within the tube 200, prior to deflagration. The high-voltage electrode assembly 204 includes a set of high-voltage electrodes 206A, 206B, 206C, with proper dielectric isolation 208A, 208B, 208C, which are installed along the length of the tube 200. Although three high-voltage electrodes 206A, 206B, 206C are shown in FIG. 2, it is to be understood that any number of electrodes could be used instead. The high-voltage electrodes 206A, 206B, 206C are connected to high voltage power drives 210, which can generate high frequency alternating voltage to generate a local electric field and low temperature plasma inside the tube 200, under the control of the controller 110. The high frequency electric field and low temperature plasma that are created by electrodes 206A, 206B, 206C break apart some of the fuel in the air/fuel mixture, generating radicals and enhancing flame speed during deflagration, and thereby reducing the transition duration of the DDT process after the air/fuel mixture is ignited in the remote chamber 102.

A detonation wave demonstrates much stronger ignition capability compared to a deflagration wave, but a prompt deflagration to detonation transition (DDT) is essential. Direct initiation of detonation without DDT process is possible, assuming that the volumetric ignition energy density is sufficient. However, for low reactivity fuels, such as methane and ammonia, the minimum ignition energy is in the MJ range, which is impractical for repeated use in engine applications. The existence of a suitably pre-treated air/fuel mixture before ignition can enhance the flame acceleration along the tube, which significantly reduces the energy demand for detonation initiation, but the timing and energy release profile is critical to achieve a successful DDT transition. Transient electric energy release via capacitive discharge can generate a local thermal explosion in microseconds, but this technique is most efficient within a limited range of flame speeds. Furthermore, if an ignition event is triggered before the arrival of the flame front, the DDT transition will be interrupted. On the other hand, if an ignition event is triggered after the arrival of the flame front, the ignition has only a limited impact on the DDT process.

As will be apparent, in view of the above discussion, the ignition timing should be controlled such that the ignition event is triggered immediately behind the flame front, thereby pushing the flame front along the flame propagation direction within the tube 200. As is shown in FIG. 2, the tubing assembly 106 further includes a high-energy discharge assembly 212. The high-energy discharge assembly 212 includes a set of sparkplugs 214A, 214B, which are installed along the tube 200. The sparkplugs 214A, 214B are connected to both an ignition device 216 and a flame detection device 218. For simplicity, only two sparkplugs 214A, 214B are shown in FIG. 2. However, as discussed in more detail below with reference to FIGS. 4A-5B, different numbers of sparkplugs may be provided in different arrangements along the length of the tube 200.

Figure 3:
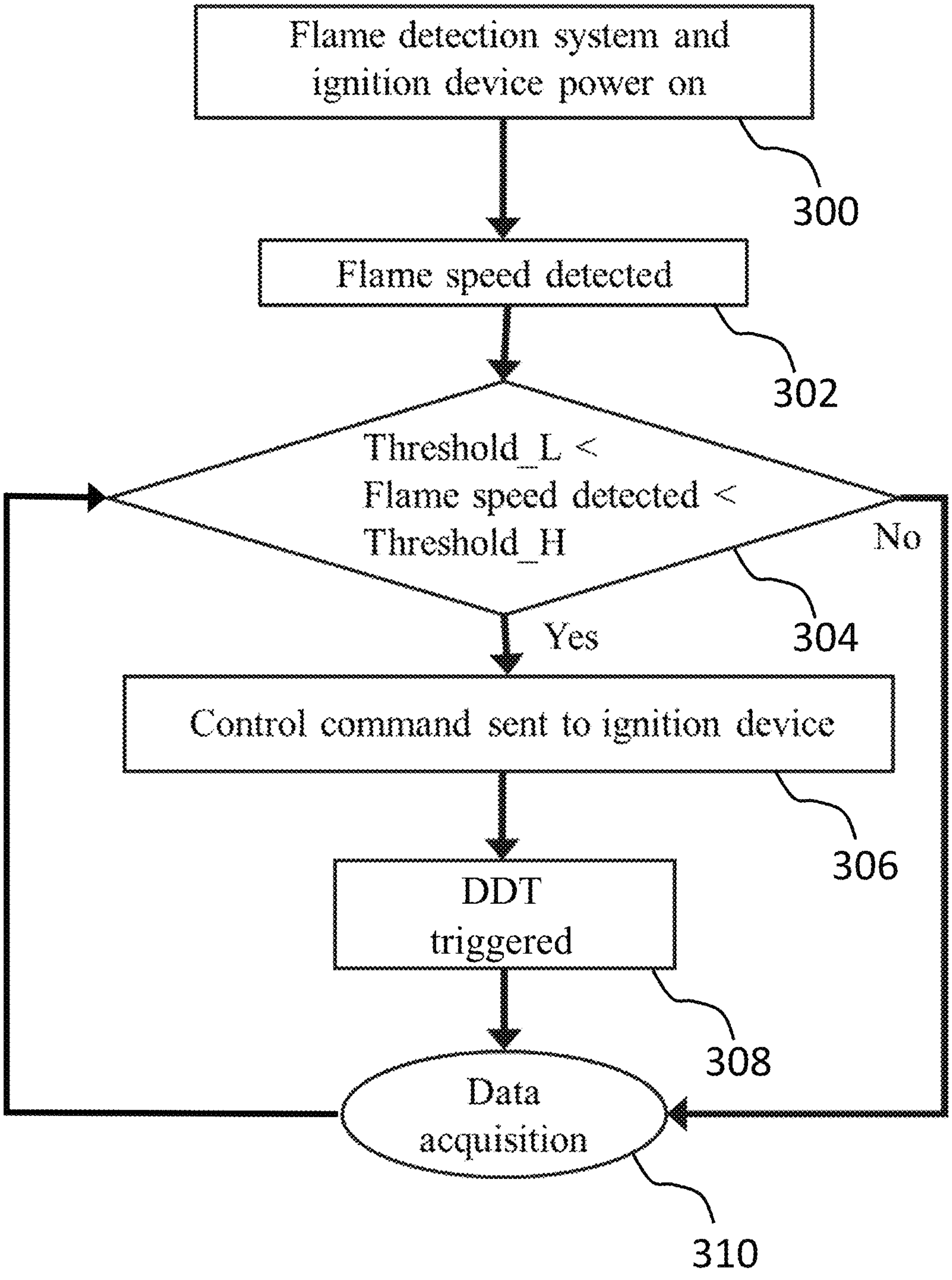
FIG. 3 is a simplified flow diagram for flame detection and control.

Referring now to the flow diagram that is shown in FIG. 3, after the ignition device 216 and the flame detection device 218 of the high-energy discharge assembly 212 has been powered on at step 300, flame sensing techniques, such as for instance ion current detection, are used to detect the arrival of the flame front at step 302. For instance, flame detection device 218 senses an ion current when the flame travels through the spark gaps 219A, 219B of sparkplugs 214A, 214B in FIG. 2. An ion current signal is received at the controller 110, which determines an estimate of the flame propagation speed within the tube 200 based on the arrival times of the flame front at each of the sparkplugs 214A, 214B. If it is determined at decision step 304 that the flame speed is between predetermined high and low threshold values, then at step 306 the controller 110 provides a control signal to the ignition device 216 to produce a transient high energy spark to the flame front via the high voltage electrode 214B, which triggers the DDT process at step 308. Data acquisition is then performed at step 310, and decision step 304 is repeated. On the other hand, if it is determined at decision step 304 that the flame speed is not between predetermined high and low threshold values, then the process moves to step 310, data acquisition is performed, and decision step 304 is repeated. Both the flame speed and intensity of the ion current signal can be used as criteria to initiate the ignition process. Fast energy release is the key to realizing this transient DDT process, with a peak discharge power of ~200 KW to ~2 MW.

The system that has been described above with reference to FIGS. 1-3 combines several features, which cooperate to provide improved ignition performance with low chemical reactivity fuels. Remote chamber 102 provides a high ignition energy and tube 200 supports flame acceleration and pre-treatment to achieve DDT, with detonation stimulation being controlled via electric energy released at precise timing and location relative to the propagating flame front.

Figure 5A:
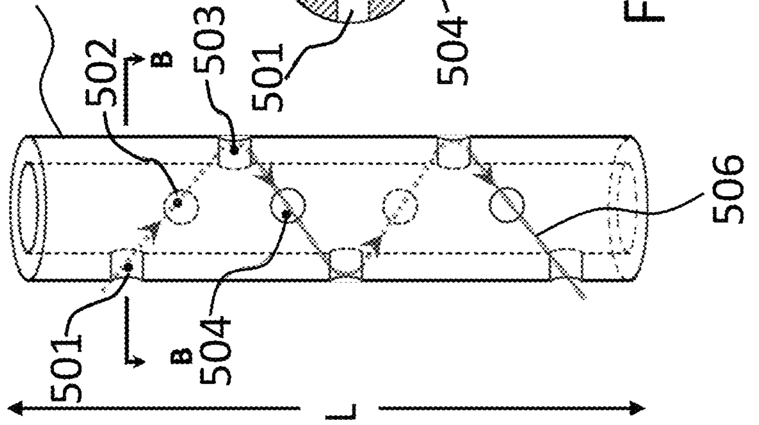
FIG. 5A is a simplified perspective diagram showing a second exemplary arrangement of high voltage electrodes.
Figure 5B:
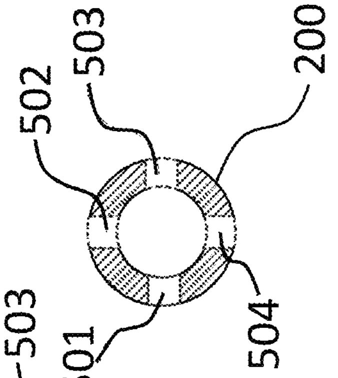
FIG. 5B is a simplified cross-sectional view taken along the line B-B in FIG. 5A.
Figure 4A:
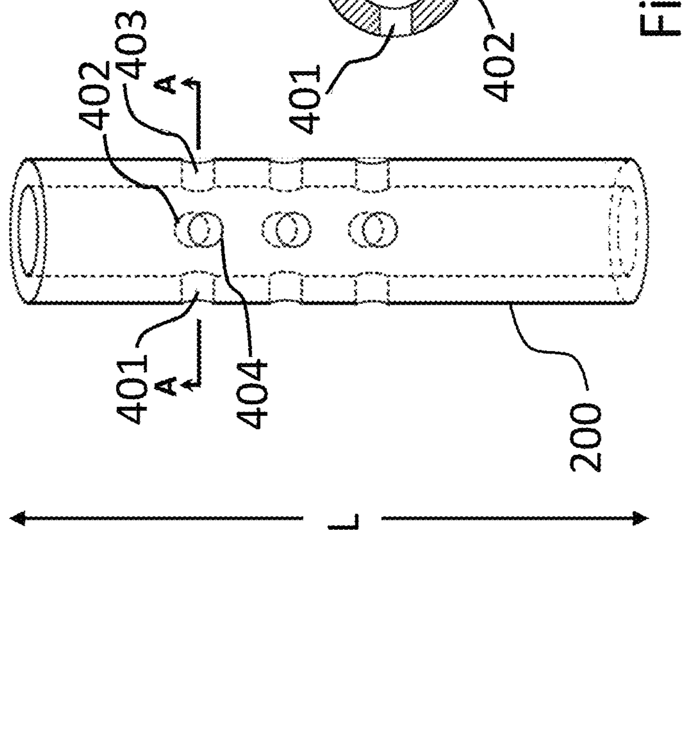
FIG. 4A is a simplified perspective diagram showing a first exemplary arrangement of high voltage electrodes.
Figure 4B:
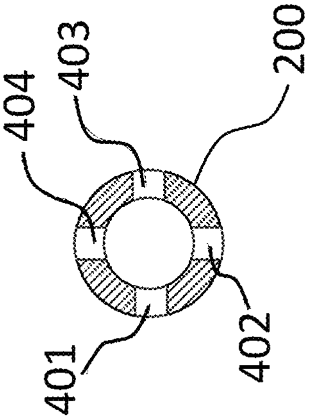
FIG. 4B is a simplified cross-sectional view taken along the line A-A in FIG. 4A.

Referring now to FIGS. 4A and 4B, shown is a first arrangement for the sparkplugs of the high-energy discharge assembly 212 of the tubing assembly 106 of system 100. FIGS. 5A and 5B show a second arrangement for the sparkplugs of the high-energy discharge assembly 212 of the tubing assembly 106 of system 100. The number of sparkplugs in the arrangements that are shown in FIGS. 4A-5B is greater than the number of sparkplugs shown in the simplified arrangement of FIG. 2, however the same control principles apply equally to all of the disclosed arrangements. Of course, the first and second sparkplug arrangements are shown merely as specific and non-limiting examples, and one of skill in the art will be able to envision other sparkplug arrangements, which may include more sparkplugs or fewer sparkplugs than are shown in FIGS. 4A-5B.

Referring still to FIGS. 4A-5B, according to detonation theory, there are two possible patterns of detonation fronts during propagation, i.e., a planar detonation front or a spiral detonation front. The first sparkplug arrangement, which is shown in FIGS. 4A and 4B, is configured for a planar detonation front. In particular, a plurality of openings 401, 402, 403, 404 are provided through the wall of the tube 200 in a planar arrangement. Additional planar arrangements of similarly formed openings are provided through the wall of the tube 200 at intervals along the length L of the tube 200. Each one of the openings 401, 402, 403, 404, etc., is configured for receiving a corresponding sparkplug (not shown in FIGS. 4A and 4B) similar to the sparkplugs 214A, 214B. Within each planar arrangement of openings there are four openings arranged circumferentially around the tube 200. In the specific example that is shown in FIGS. 4A and 4B, the openings 401, 402, 403, 404 are arranged at 90° intervals around the circumference of the tube 200, as is shown most clearly in FIG. 4B, which is a cross-sectional view taken in the plane A-A of FIG. 4A. Of course, more than four openings or less than four openings could be arranged within the plane A-A, such as for instance three openings arranged at 120° intervals or five openings arranged at 72° intervals, etc. Alternatively, the circumferential spacing between adjacent openings within the same plane is not equal. Further alternatively, some planar arrangements may include a different number of openings than other planar arrangements and/or the openings in one planar arrangement may either be aligned with the openings in other planar arrangements or offset therefrom around the circumference of the tube 200.

The second sparkplug arrangement, which is shown in FIGS. 5A and 5B, is configured for a spiral detonation front. In particular, a plurality of openings 501, 502, 503, 504, etc., are provided in a spiral arrangement extending along a spiral path 506 in the length direction (L) of the tube 200. Each one of the openings 501, 502, 503, 504, etc., is configured for receiving a corresponding sparkplug (not shown in FIGS. 5A and 5B) similar to the sparkplugs 214A, 214B. As is shown most clearly in FIG. 5B, which is a cross-sectional view taken in the plane B-B shown in FIG. 5A, the openings 501, 502, 503, 504, etc., are not all in the same plane B-B. In the specific and non-limiting example that is shown in FIGS. 5A and 5B, the circumferential spacing between adjacent openings along the spiral path 506 is 90°. Of course, the spacing between adjacent openings in both the circumferential direction and along the length direction (L) may be varied for a particular application.

FIGS. 4A-5B illustrate a portion of the tube 200 of the tubing assembly 106. It is not necessary to arrange the sparkplugs along the full length of the tube 200. Rather, the sparkplugs are arranged along a portion of the length (L) of the tube 200 within which the DDT transition occurs. This portion of the tube 200 may be determined based on e.g., the type of air/fuel mixture being provided in a specific application, etc.

Figure 6A:
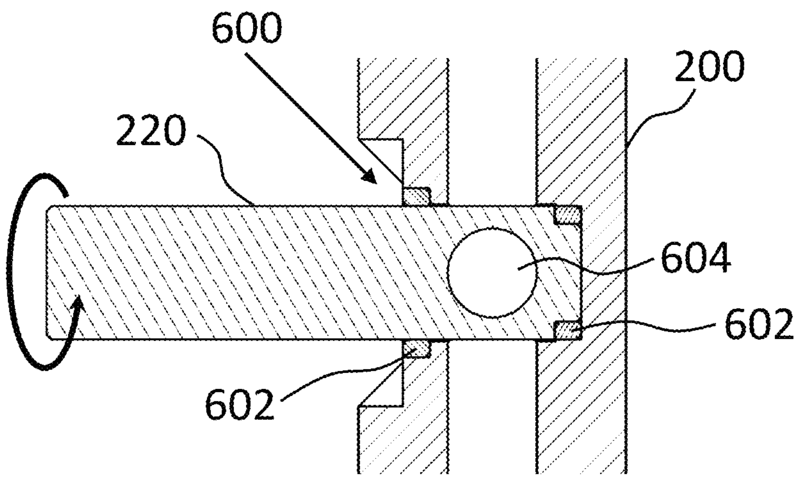
FIG. 6A is a simplified diagram showing a rotary valve in an open position.
Figure 6B:
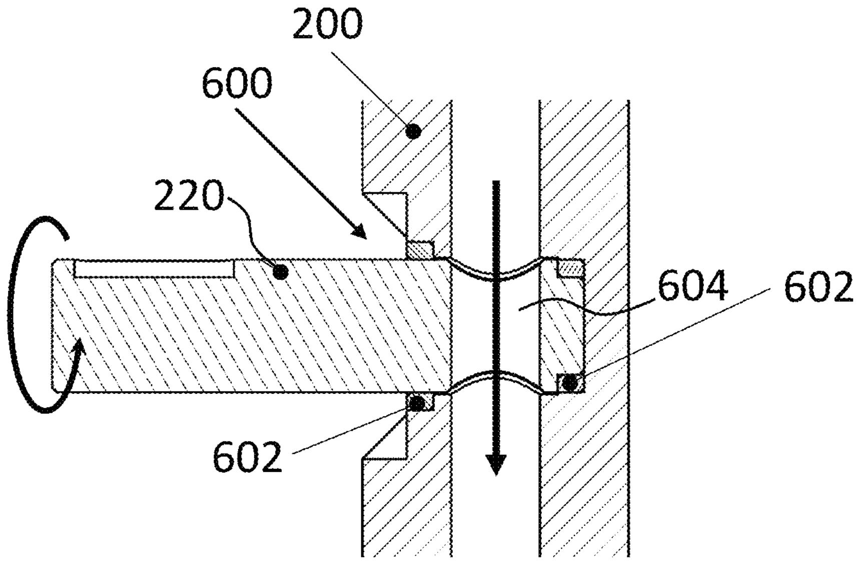
FIG. 6B is a simplified diagram showing a rotary valve in a closed position.

Referring again to FIG. 2 and also to FIGS. 6A and 6B, the tubing assembly 106 further includes a rotary valve 220 that is mounted within the tube 200 at an end thereof proximate to the main combustion chamber 104. More particularly, the rotary valve 220 is provided within an opening 600 that is formed through the wall of the tube 200, as is shown most clearly in FIGS. 6A and 6B. Gas tight seals are provided between the rotary valve 220 and the tube 200 by bearings 602, which also support rotational movement of the rotary valve within the opening 600 under control of the controller 110 (not shown in FIGS. 6A and 6B). The passageway 604 of the rotary valve 220 is sized to match the inner diameter of tube 200, such that a flame propagating between the remote chamber 102 and the main combustion chamber 104 experiences a constant tube diameter along the full length of the tube 200.

Figure 7:
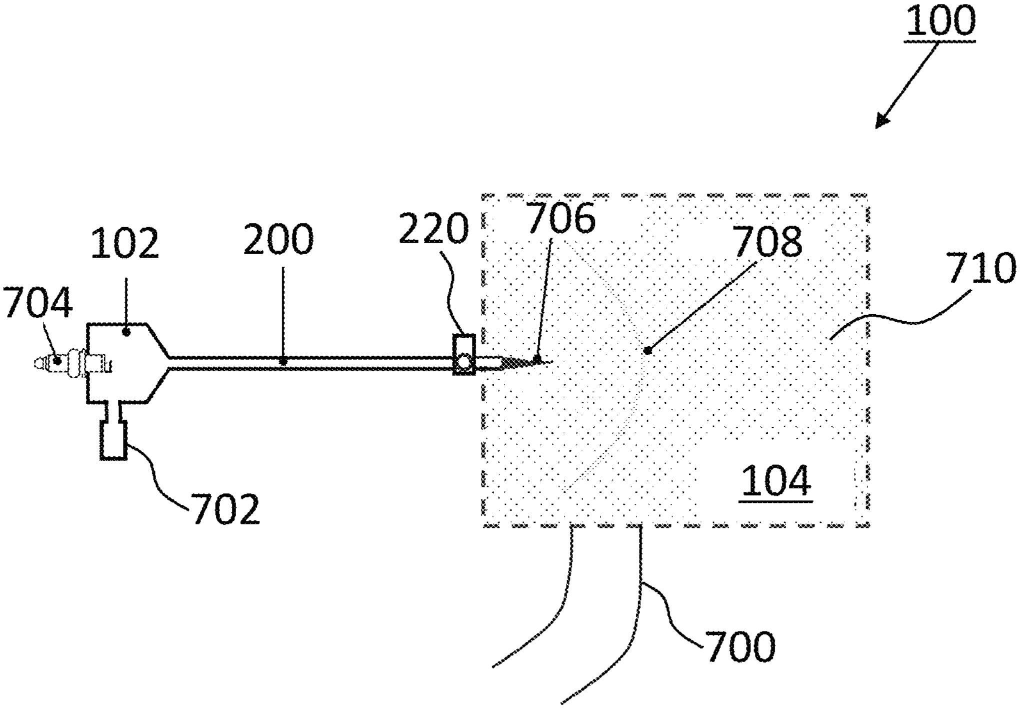
FIG. 7 is a simplified diagram illustrating the formation of detonation waves in a charge gas within a main combustion chamber.

Operation of the rotary valve will now be discussed with reference to FIG. 7, which is a simplified diagram showing the main elements of system 100. As will be apparent, various elements that are not necessary for an understanding of this discussion have been omitted from FIG. 7 in order to provide improved clarity. During use, the remote chamber 102, the tube 200, and the main combustion chamber 104 are all filled with a combustible charge gas (e.g., an air/fuel mixture) during a charging process (e.g., during the intake stroke of an internal combustion engine). In some implementations, the remote chamber 102 and the tube 200 are filled with the same combustible charge gas that is provided to the main combustion chamber 104 via a manifold 700. However, in other implementations one or more separate injectors 702 is used to provide a combustible charge gas into the remote chamber 102 and into the tube 200 that is different from the combustible charge gas that is provided into the main combustion chamber 104. In such implementations, the rotary valve 220 is in an open condition (shown in FIG. 6B) during the charging process and is switched to a closed condition (shown in FIG. 6A) after the charging process is complete or nearly complete but prior to the start of the engine compression stroke. Specifically, during charging of the system 100 the rotary valve 220 is in the open condition to allow the main combustion chamber 104 to be filled with a first charge gas via the manifold 700 and to allow the remote chamber 102 and tube 200 to be uniformly filled with a second charge gas provided via the one or more separate injectors 702. When in the closed condition, the rotary valve 220 acts to prevent mixing of the first charge gas with the second charge gas.

Figure 8:
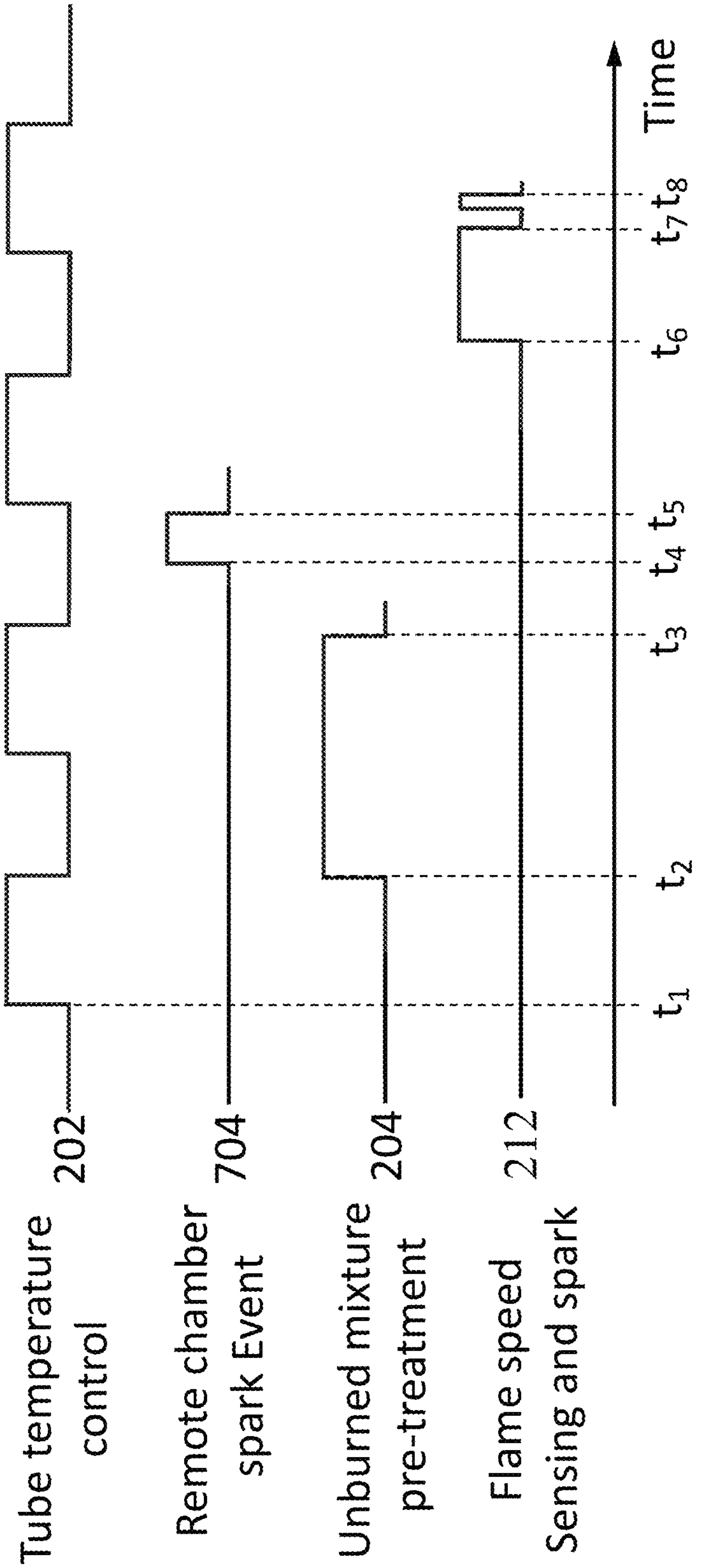
FIG. 8 is a timing diagram for the tubing assembly of FIG. 2.

Now referring to FIG. 7 and also to FIG. 8, the timing of the various processes that occur during the operation of the system 100 will be discussed. Firstly, the system is charged with one or more combustible mixtures as discussed above. For the purpose of this discussion it is assumed that the main combustion chamber 104 is filled with a first charge gas and the remote chamber 102 and tube 200 are filled with a second charge gas that is different than the first charge gas. For instance, the second charge gas may have a higher chemical reactivity compared to the first charge gas. After the charging process has been substantially completed, the rotary valve 220 may be switched from the open condition into the closed condition to prevent movement of the gases between different parts of the system, as described above. Tube temperature control begins at time $t_1$ by controlling the temperature control layer 202 to heat the tube 200 to a temperature within a predetermined temperature range. The tube temperature control continues throughout the duration of engine operation, so as to maintain the wall of tube 200 within a working range when the tube is filled with the second charge gas, during pretreatment of the second charge gas prior to deflagration, during deflagration and during detonation phase. For instance, the temperature control layer 202 is operated on a PMW basis with an on-off pattern as shown in FIG. 8, and the duty cycle of the PMW can be adjusted adaptively according to fuel type and engine operation condition. Optionally, $t_1$ may precede engine start for cold engine starts, to allow the tube to warm to the working range prior to igniting the initial charge of the second charge gas.

The high-voltage electrode assembly 204 begins pretreating the unburned second charge gas inside the tube 200 at time $t_2$ using low-temperature plasma and/or high frequency oscillating electric fields to generate radicals suitable for promoting high speed flame propagation along tube 200. The rotary valve 220 is switched from the closed condition to the open condition during pretreatment, preferably close to the end of the engine compression stroke. After the pretreatment ends at $t_3$, a sparkplug 704 mounted on the remote chamber 102 is used to initiate the combustion process and generates a flame kernel within the second charge gas inside the remote chamber 102. The sparkplug 704 is energized $t_4$ and initiate the spark event at $t_5$.

The flame propagates initially within the remote chamber 102, then exits into the tube 200. At $t_6$ the flame passes the sparkplugs 214A and 214B, which serve both as ion sensors and ignitors. By determining the time it takes for the flame to travel from spark gap 219A to spark gap 219B, it is possible to estimate a local flame speed. If the flame speed falls within a predetermined range that is deemed suitable for detonation stimulation at $t_7$, then at $t_8$ a transient high energy spark is initiated within spark gap 219B of spark plug 214B, directly behind the flame front, to push the flame faster, reaching detonation stage.

The flame eventually passes through the open rotary valve 220 and exits from tube 200 into the main combustion chamber 104, producing a flame front 706 that generates a detonation wave 708 igniting the air/fuel mixture of the first charge gas 710 within the main combustion chamber 104. The ignition energy delivered to the combustion chamber 104 depends on various parameters, including but not limited to i) the size of the remote chamber 102 and ii) the pressure of the air/fuel mixture prior to ignition. Compared with plasma-based ignition techniques, the system 100 can deliver much higher ignition energies into the combustion chamber 104. By way of a specific and non-limiting example, the system 100 may deliver between ~200 J and ~400 J of energy. Furthermore, compared to diesel high-pressure direct fuel injection as the ignition source of a dual-fuel natural gas engine, the systems and methods described in accordance with the various embodiments of the instant invention use a pre-mixed combustible mixture, generating zero particulate matter emissions despite the oxygen concentration inside the main combustion chamber 104. The detonation wave increases the combustion efficiency and results in clean combustion.

Figure 9:
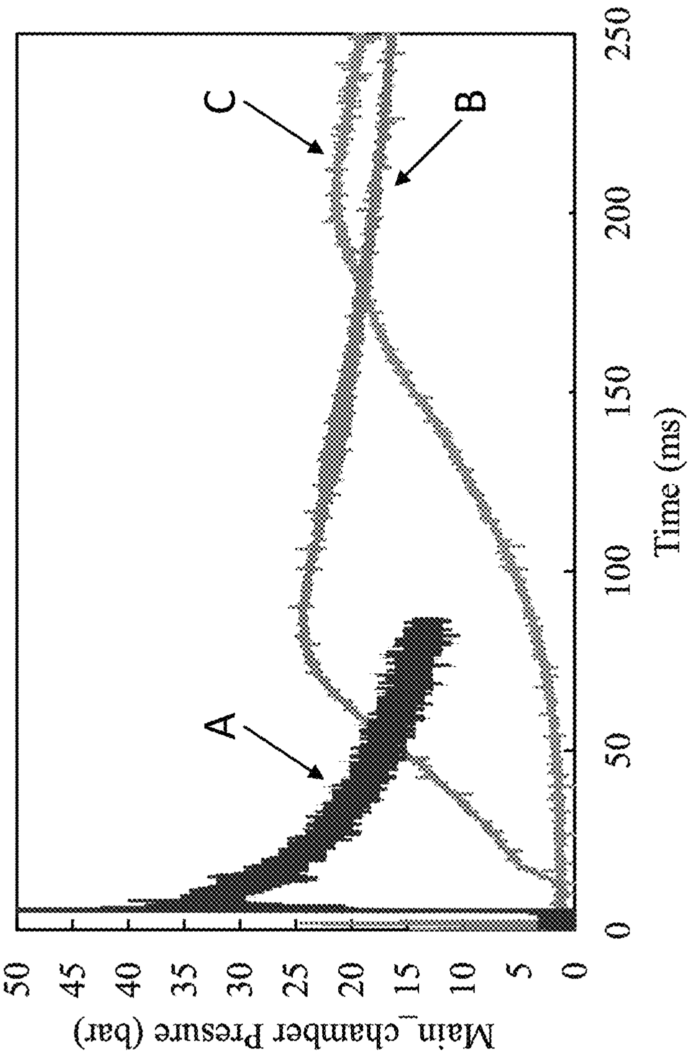
FIG. 9 shows the plots of main combustion chamber pressure vs. time for three different ignition processes: A) tube detonation ignition using a system according to an embodiment: B) deflagration ignition, which represents a typical prechamber ignition process; and C) normal ignition.

Referring now to FIG. 9, shown are plots of the pressure in the main combustion chamber 104 vs. time for three different ignition processes: A) tube detonation ignition using a system according to an embodiment of the invention: B) deflagration ignition, which represents a typical prechamber ignition process; and C) normal ignition. As will be apparent, the high ignition energy and fast flame speed (~2000 m/s) results in a combustion duration of ~0.5 ms, which enhances both the combustion efficiency and thermal efficiency compared to the tube deflagration ignition (flame speed ~100-400 m/s, combustion duration ~80 ms) and normal ignition (combustion duration ~200 ms).

EXAMPLES

Example 1

Figure 10:
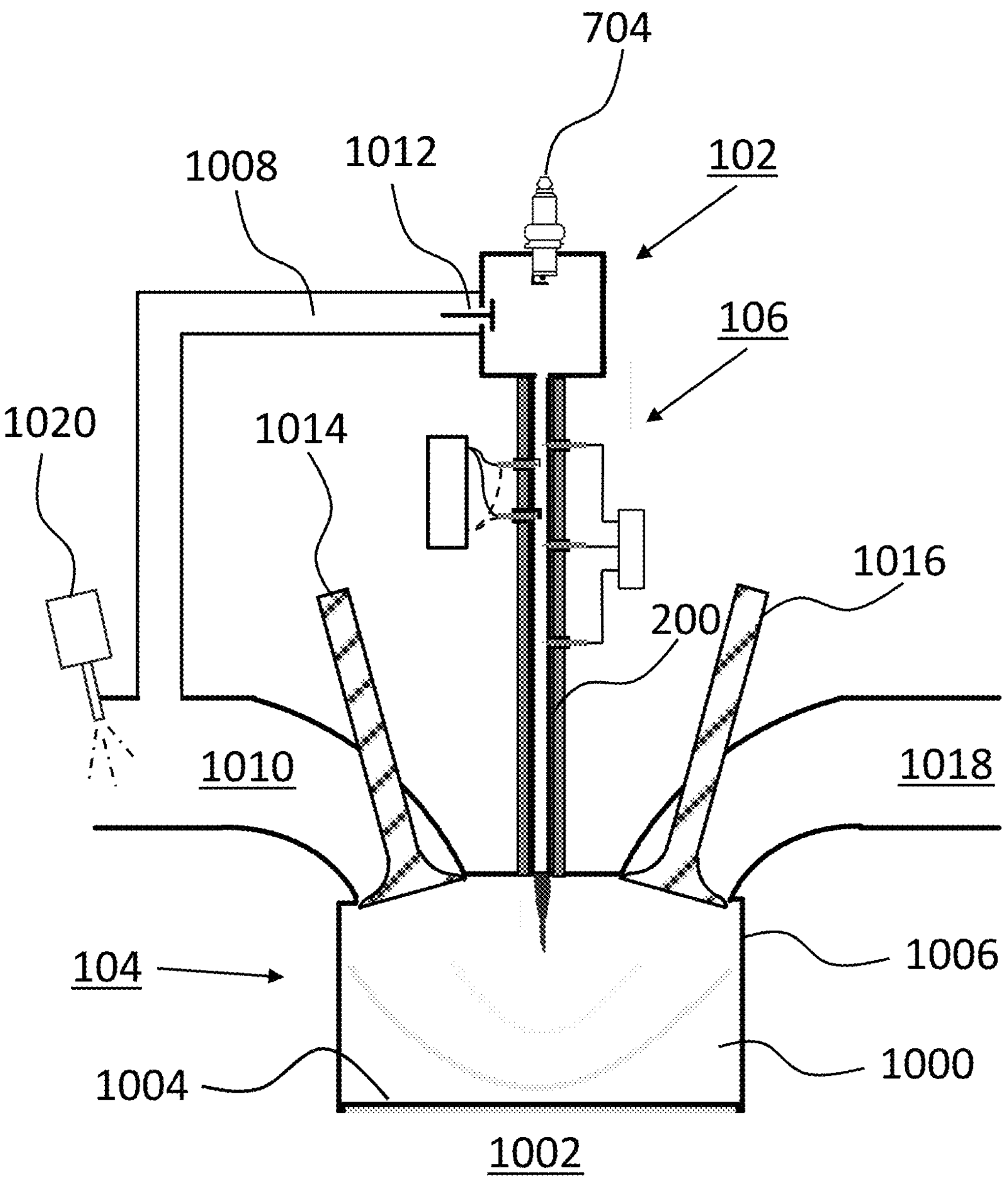
FIG. 10 depicts a portion of an internal combustion engine including a remote chamber ignition system, in accordance with an embodiment.

FIG. 10 depicts a portion of an internal combustion engine including a remote chamber ignition system, in accordance with an embodiment. Remote chamber 102 is in fluid communication with main combustion chamber 104 via tubing assembly 106. The main combustion chamber 104 is defined within a cylinder 1000. A piston 1002 having a top surface 1004 is moveably disposed within the cylinder 1000 and sealingly engages with the inner surfaces of the walls 1006 of the cylinder 1000. A gas exchange conduit 1008 extends between engine intake manifold 1010 and gas exchange valve 1012 of remote chamber 102. Also shown in FIG. 10 are sparkplug 704 mounted on remote chamber 102, engine intake valve 1014 between the cylinder 1000 and engine intake manifold 1010, and engine exhaust valve 1016 between the cylinder 1000 and engine exhaust manifold 1018. A fuel injector 1020 is provided in fluid communication with the engine intake manifold 1010, upstream of the gas exchange conduit 1008.

In the system that is shown in FIG. 10, the fuel injector 1020 provides a fuel that becomes mixed with the gases in the engine intake manifold 1010, i.e., mixed with air. For instance, suitable fuels for use with an internal combustion engine configured as shown in FIG. 10 include low carbon fuels such as natural gas and zero carbon fuels such as ammonia. As will be apparent, the main combustion chamber 104, the remote chamber 102, and the tube 200 of the tubing assembly 106 are all filled with the same combustible mixture, i.e., with the same air/fuel mixture. The rotary valve 220 is not required for the operation of the system that is shown in FIG. 10, rather it is optional and therefore has been omitted in FIG. 10.

Figure 11B:
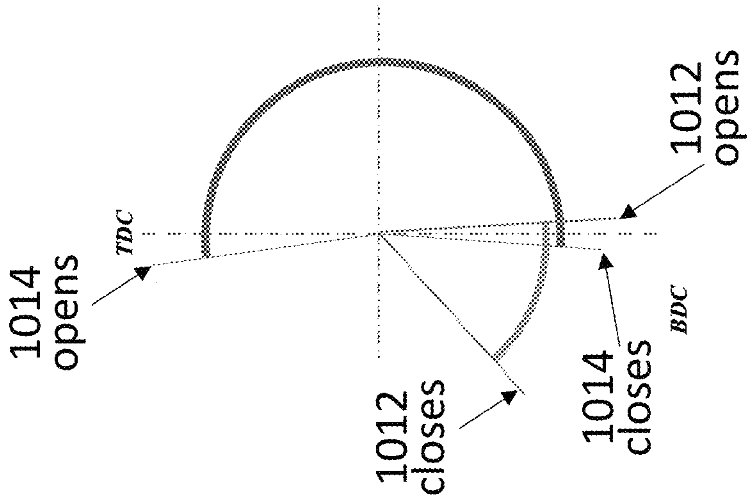
FIG. 11B is a simplified timing diagram for operating the system of FIG. 10 in the first mode.
Figure 11A:
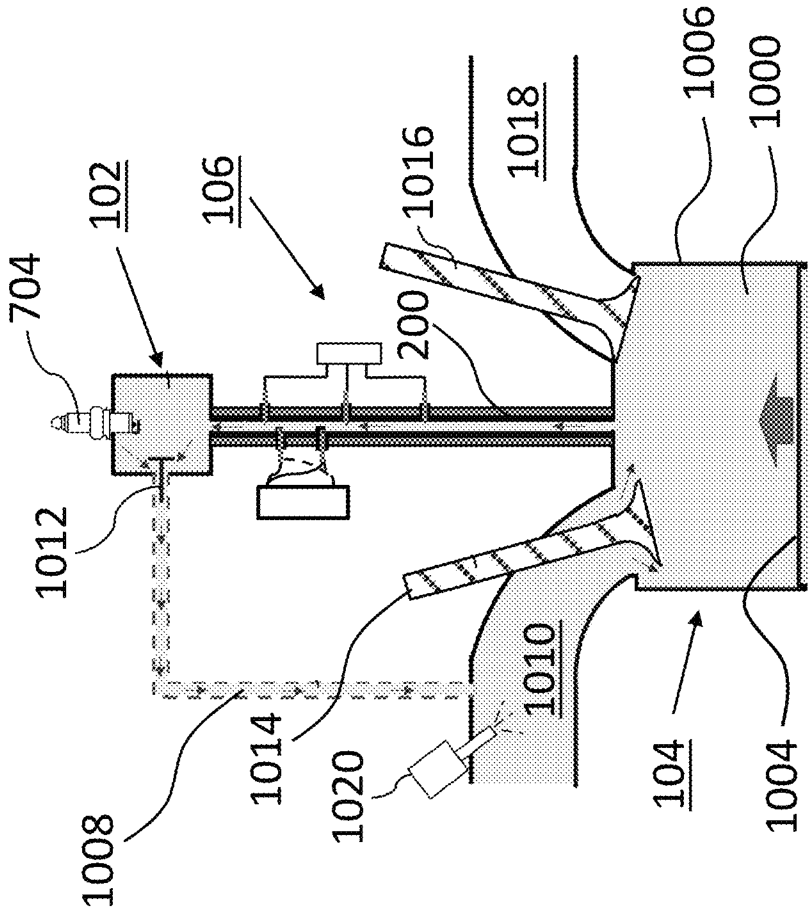
FIG. 11A is a simplified diagram showing the system of FIG. 10 being operated in a first mode.

FIG. 11A shows the system of FIG. 10 being operated in a first mode in which the gas exchange valve 1012 is timed to open and close such that a fresh charge of the air/fuel mixture is delivered to the remote chamber 102 via the tubing assembly 106 during the compression stroke of the piston 1002. As is shown in the timing diagram in FIG. 11B, the gas exchange valve 1012 opens at the start of the compression stroke. When the gas exchange valve 1012 is opened, the pressure difference between the main combustion chamber 104 and the intake manifold 1010 drives a fresh charge of the air/fuel mixture into the remote chamber 102 via the tubing assembly 106, and the residual gas remaining in the remoter chamber 102 after the previous ignition cycle is pushed into the intake manifold 1010 via the opened gas exchange valve 1012 and the gas exchange conduit 1008. Because of the relatively small volume of the remote chamber 102, the overall air/fuel ratio in the intake manifold 1010 is not meaningfully affected.

Figure 12B:
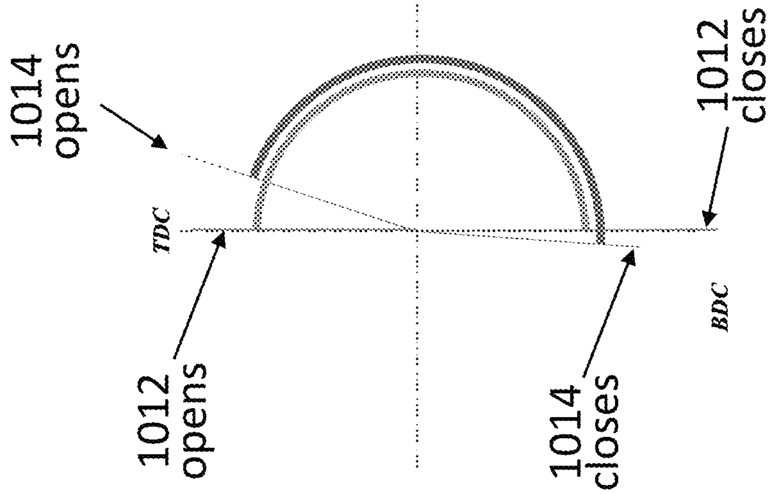
FIG. 12B is a simplified timing diagram for operating the system of FIG. 10 in the second mode.
Figure 12A:
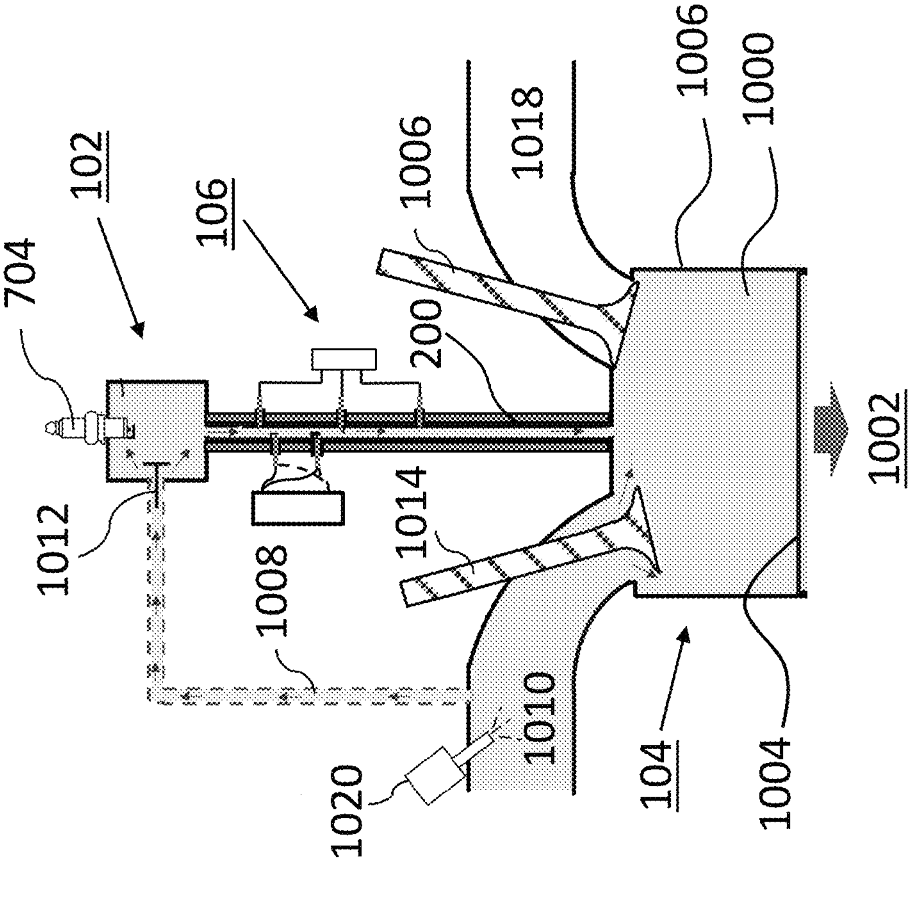
FIG. 12A is a simplified diagram showing the system of FIG. 10 being operated in a second mode.

FIG. 12A shows the system of FIG. 10 being operated in a second mode in which the gas exchange valve 1012 is timed to open and close such that a fresh charge of an air/fuel mixture is delivered to the remote chamber 102 via the gas exchange conduit 1008 during the intake stroke of the piston 1002. As is shown in the timing diagram in FIG. 12B, the gas exchange valve 1012 opens at the start of the intake stroke. During the period of time before the engine intake valve 1014 opens, the exhaust gas in the remote chamber 102 is forced to flow into the engine main combustion chamber 104 and is replaced by fresh air/fuel mixture directly from the intake manifold 1010 via the gas exchange conduit 1008. The gas exchange valve 1012 closes at the end of the intake stroke, such that the air fuel mixture in the remote chamber 102 is compressed together with the intake charge in the main combustion chamber 104. Because of the relatively large volume of the main combustion chamber 104 compared to the volume of the remote chamber 102, the composition of the intake charge will not be significantly affected by the venting of the residual gas in the remote chamber 102 from the previous cycle.

At the end of the compression stroke in both the first and second modes of operating the system of FIG. 10, the remote chamber 102, the tube 200 of the tubing assembly 106, and the main combustion chamber 104 are in fluid communication with one another and contain a homogeneous air/fuel mixture that is ready to be combusted. The sparkplug 704 is used to create a flame kernel in the remote chamber 102, and the tubing assembly 106 is used to pre-treat the flame during propagation through the tube 200 and cause DDT. The resulting detonation wave then ignites the air/fuel mixture within the main combustion chamber 104, and the products of the combustion process are removed from the system during the exhaust stroke of the piston 1002.

Example 2

Figure 13B:
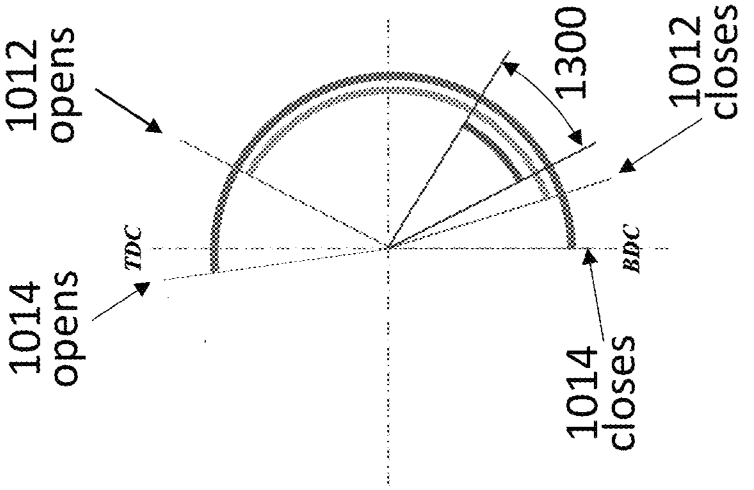
FIG. 13B is a simplified timing diagram for the system of FIG. 13A.
Figure 13A:
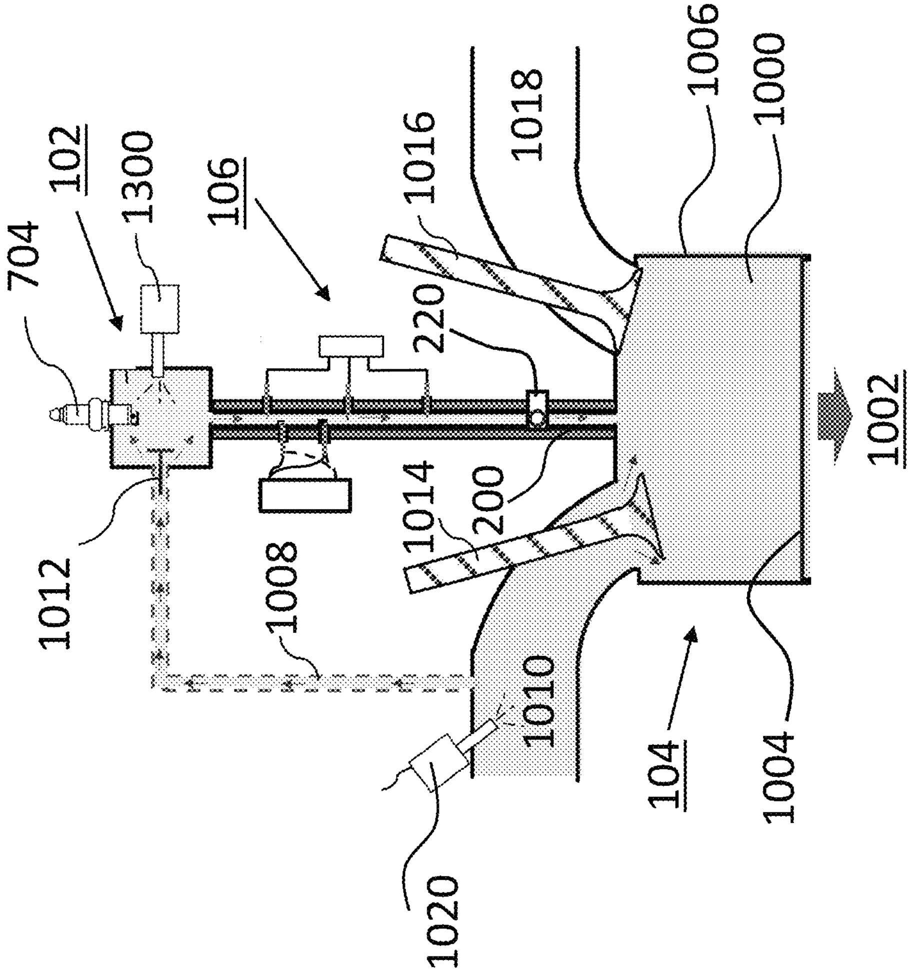
FIG. 13A depicts a portion of an internal combustion engine including a remote chamber ignition system, in accordance with an embodiment.

FIG. 13A depicts a portion of an internal combustion engine including a remote chamber ignition system, in accordance with an embodiment. Remote chamber 102 is in fluid communication with main combustion chamber 104 via tubing assembly 106. The main combustion chamber 104 is defined within a cylinder 1000. A piston 1002 having a top surface 1004 is moveably disposed within the cylinder 1000 and sealingly engages with the inner surfaces of the walls 1006 of the cylinder 1000. A gas exchange conduit 1008 extends between engine intake manifold 1010 and gas exchange valve 1012 of remote chamber 102. Also shown in FIG. 13A are sparkplug 704 mounted on remote chamber 102, engine intake valve 1014 between the cylinder 1000 and engine intake manifold 1010, and engine exhaust valve 1016 between the cylinder 1000 and engine exhaust manifold 1018. A main fuel injector 1020 is provided in fluid communication with the engine intake manifold 1010 and is disposed upstream of the gas exchange conduit 1008. A second fuel injector 1300 is fluidly coupled to the remote chamber 102 for dynamically adjusting the air/fuel ratio in the remote chamber 102. Such an arrangement is advantageous when the system is operating under lean burn or heavily diluted conditions, in order to avoid flame quenching during flame propagation through the tubing assembly 106.

Operation of the system that is shown in FIG. 13A, in a mode in which the gas exchange valve 1012 is timed to open and close such that a fresh charge of the air/fuel mixture is delivered to the remote chamber 104 via the gas exchange conduit 1008 during the intake stroke of the piston 1002, will now be described with reference also to FIG. 13B. As is shown in FIG. 13A, one end of the gas exchange conduit 1008 is open to the intake manifold 1010 downstream of the main fuel injector 1020. When the reactivity of the air/fuel mixture in the intake manifold 1010 results in challenges to flame propagation in the tubing assembly 106, second fuel injector 1300 can be used to adjust the air/fuel ratio of the local mixture in the remote chamber 102 and tubing assembly 106. As is shown in FIG. 13B, the gas exchange valve 1012 is opened after the engine intake valve 1014 during the piston intake stroke of the engine. Fuel injector 1300 injects fuel into the remote chamber 102 while both valves 1012 and 1014 are open, which relatively increases the amount of fuel in the air/fuel mixture in the remote chamber 102 and in the tubing assembly 106. Near the end of the intake stroke, the fuel injector 1300 stops injecting fuel, and the gas exchange valve 1012 remains open for a short time, during which time the air/fuel mixture from the intake manifold 1010 continues to flow into the remote chamber 102 via the gas exchange conduit 1008. Next, the gas exchange valve 1012 is closed, and then finally the engine intake valve 1014 is closed.

The closing times of the engine intake valve 1014 and of the gas exchange valve 1012 should be controlled such that the remote chamber 102 and the tube 200 of the tubing assembly 106 are filled with the fuel-enriched air/fuel mixture, while only a limited amount of fuel-enriched air/fuel mixture flows into the main combustion chamber 102. As will be apparent, in this example the air/fuel ratio within the remote chamber 102 and the tubing assembly 106 is adjusted such that flame propagation is achieved, and in particular the flame is not quenched before it reaches the main combustion chamber 104 and ignites the air/fuel mixture therein.

Referring still to FIG. 13A, the rotary valve 220 is open during the filling of the remote chamber 102 and the tube 200 of the tubing assembly. At the end of the intake stroke or the beginning of the compression stroke of the piston 1002, the rotary valve is switched from the open condition to the closed condition, to prevent the relatively diluted air/fuel mixture in the main combustion chamber from entering the tube 200. The rotary valve 220 ensures that the air/fuel mixture within the remote chamber 102 and the tube 200 is homogeneous and supports an efficient DDT.

At the end of the compression stroke, the rotary valve 220 is switched back to the open condition such that the remote chamber 102, the tube 200 of the tubing assembly 106, and the main combustion chamber 104 are in fluid communication with one another. The sparkplug 704 is used to create a flame kernel in the remote chamber 102, and the tubing assembly 106 is used to pre-treat the flame during propagation through the tube 200 and cause DDT. The resulting detonation wave then ignites the air/fuel mixture within the main combustion chamber 104, and the products of the combustion process are removed from the system during the exhaust stroke of the piston 1002.

Example 3

Figure 14B:
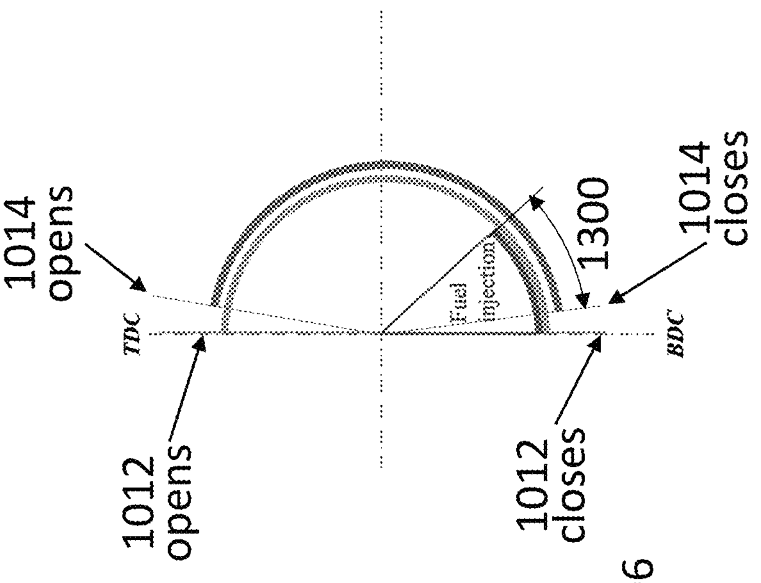
FIG. 14B is a simplified timing diagram for the system of FIG. 14A.
Figure 14A:
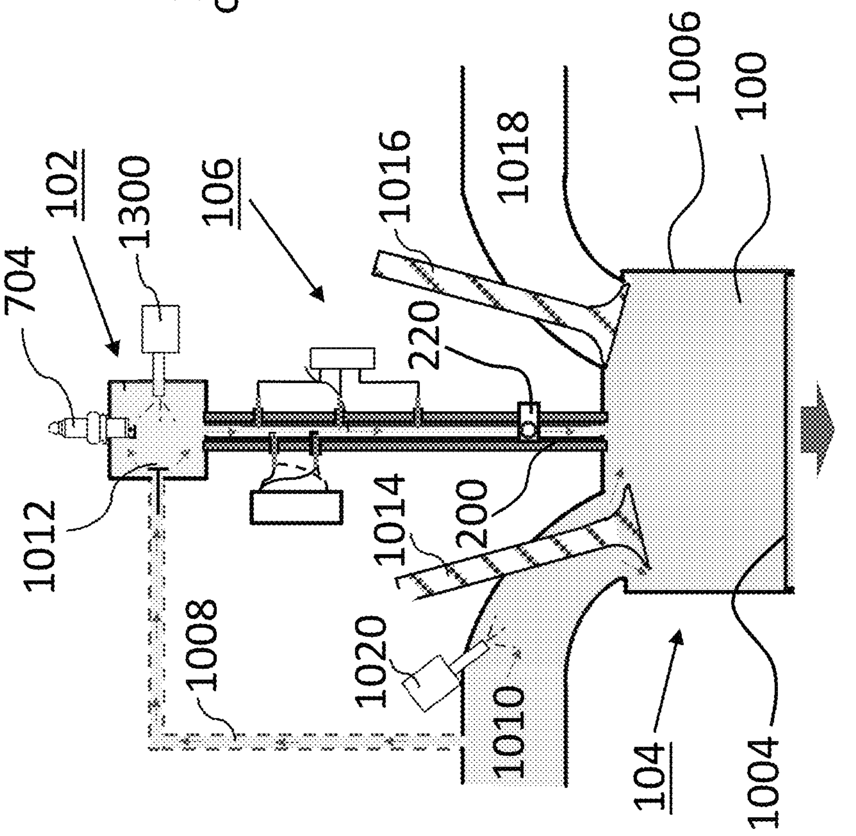
FIG. 14A depicts a portion of an internal combustion engine including a remote chamber ignition system, in accordance with an embodiment.

FIG. 14A depicts a portion of an internal combustion engine including a remote chamber ignition system, in accordance with an embodiment. Remote chamber 102 is in fluid communication with main combustion chamber 104 via tubing assembly 106. The main combustion chamber 104 is defined within a cylinder 1000. A piston 1002 having a top surface 1004 is moveably disposed within the cylinder 1000 and sealingly engages with the inner surfaces of the walls 1006 of the cylinder 1000. A gas exchange conduit 1008 extends between engine intake manifold 1010 and gas exchange valve 1012 of remote chamber 102. Also shown in FIG. 14A are sparkplug 704 mounted on remote chamber 102, engine intake valve 1014 between the cylinder 1000 and engine intake manifold 1010, and engine exhaust valve 1016 between the cylinder 1000 and engine exhaust manifold 1018. A main fuel injector 1020 is provided in fluid communication with the engine intake manifold 1010 and is disposed downstream of the gas exchange conduit 1008. A second fuel injector 1300 is fluidly coupled to the remote chamber 102 for dynamically adjusting the air/fuel ratio in the remote chamber 102. Such an arrangement is advantageous when the system is operating under lean burn or heavily diluted conditions, in order to avoid flame quenching during flame propagation through the tubing assembly 106.

Operation of the system that is shown in FIG. 14A, in a mode in which the gas exchange valve 1012 is timed to open and close such that a fresh charge of the air/fuel mixture is delivered to the remote chamber 104 via the gas exchange conduit 1012 during the piston intake stroke of the engine, will now be described with reference also to FIG. 14B. More particularly, FIGS. 14A and 14B show a dual-fuel combustion mode, in which an air/fuel mixture in the remote chamber 102 and in the tubing assembly 106 is prepared using a fuel with higher chemical reactivity (e.g., hydrogen, DME, etc.) compared with the fuel that is used to charge the main combustion chamber 104 (e.g., natural gas, ammonia, etc.).

As is shown in FIG. 14A, one end of the gas exchange conduit 1008 is open to the intake manifold 1010 upstream of the main fuel injector 1020, such that only fresh air flows into the remote chamber 102 via the gas exchange conduit 1008. As is shown in FIG. 14B, the intake valve 1014 opens later than the gas exchange valve 1012 during the piston intake stroke, to enhance the gas exchange process in the remote chamber 102 and in the tubing assembly 106. Near the end of the intake stroke, a high chemical reactivity fuel is injected into the remote chamber 102 via the second fuel injector 1300, to prepare the fuel mixture in the remote chamber 102 for the ignition event. The intake valve 1014 then closes earlier than the gas exchange valve 1012, before the piston reaches the bottom dead center (BDC), allowing the mixture in the remote chamber 102 to fill up the tubing assembly 106 for the DDT process.

At the end of the intake stroke or the beginning of the compression stroke of the piston 1002, the rotary valve 220 is switched from the open condition to the closed condition, to prevent the air/fuel mixture in the main combustion chamber 104 from entering the tube 200. The rotary valve 220 ensures that the air/fuel mixture within the remote chamber 102 and the tube 200 is homogeneous and supports an efficient DDT. At the end of the compression stroke, the rotary valve 220 is switched back to the open condition such that the remote chamber 102, the tube 200 of the tubing assembly 106, and the main combustion chamber 104 are in fluid communication with one another. The sparkplug 704 is used to create a flame kernel in the remote chamber 102, and the tubing assembly 106 is used to pre-treat the flame during propagation through the tube 200 and cause DDT. The resulting detonation wave then ignites the air/fuel mixture within the main combustion chamber 104, and the products of the combustion process are removed from the system during the exhaust stroke of the piston 1002.

Example 4

Figure 15:
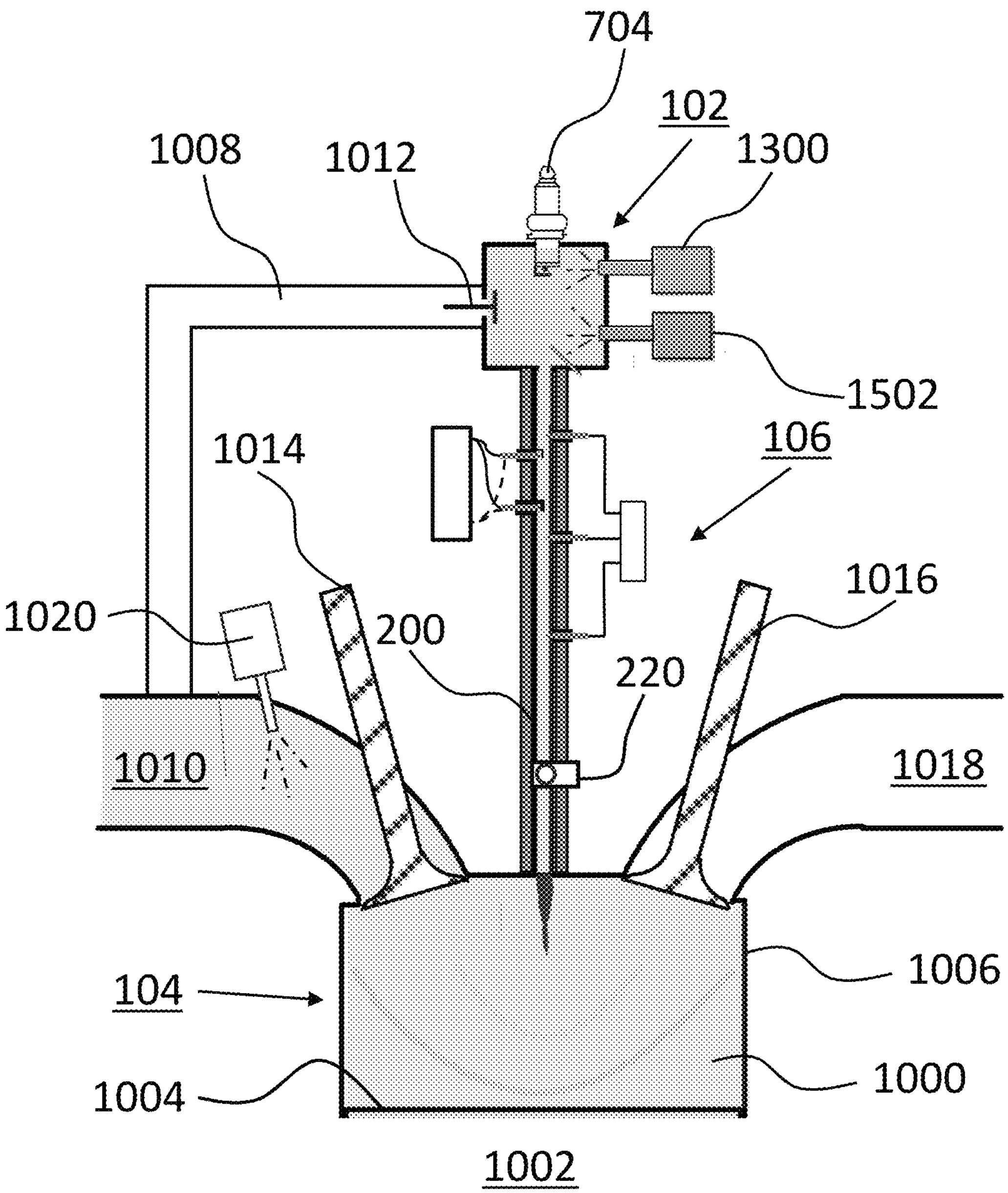
FIG. 15 depicts a portion of an internal combustion engine including a remote chamber ignition system, in accordance with an embodiment.

FIG. 15 depicts a portion of an internal combustion engine including a remote chamber ignition system, in accordance with an embodiment. Remote chamber 102 is in fluid communication with main combustion chamber 104 via tubing assembly 106. The main combustion chamber 104 is defined within a cylinder 1000. A piston 1002 having a top surface 1004 is moveably disposed within the cylinder 1000 and sealingly engages with the inner surfaces of the walls 1006 of the cylinder 1000. A gas exchange conduit 1008 extends between engine intake manifold 1010 and gas exchange valve 1012 of remote chamber 102. Also shown in FIG. 15 are sparkplug 704 mounted on remote chamber 102, engine intake valve 1014 between the cylinder 1000 and engine intake manifold 1010, and engine exhaust valve 1016 between the cylinder 1000 and engine exhaust manifold 1018. A main fuel injector 1020 is provided in fluid communication with the engine intake manifold 1010 and is disposed downstream of the gas exchange conduit 1008.

A second fuel injector 1300 is fluidly coupled to the remote chamber 102 for dynamically adjusting the fuel mixture composition in the remote chamber 102. For instance, the second fuel injector 1300 injects fuel, which may be either the same as or different than the fuel that is fed into the main combustion chamber 104. An additional injector 1502 is also fluidly coupled to the remote chamber 102, and also for use in dynamically adjusting the fuel mixture composition in the remote chamber 102. For instance, the injector 1502 is used to inject air, oxygen enriched air, or pure oxygen into the remote chamber 102. Such an arrangement is advantageous when the engine is operating under lean burn or heavily diluted conditions, in order to avoid flame quenching during flame propagation through the tubing assembly 106.

The second fuel injector 1300 is used e.g., to inject fuel with a chemical reactivity higher than the chemical reactivity of the fuel that is fed into the main combustion chamber 104. The injector 1502 is used to inject air, or oxygen enriched air, or pure oxygen, into the remote chamber 104. In some embodiments, the injector 1502 is connected directly to a high-pressure source (not illustrated in FIG. 15), such as a turbine or plunger-based compressor. The flow rate of the second injector 1300 and of the injector 1502 can be controlled such that the chemical reactivity of the air/fuel mixture is suitable for a flame to propagate and self-accelerate to reach detonation stage in the tubing assembly 106.

During the compression stroke of the piston 1002, the two injectors 1300 and 1502 continue to inject fuel and air/oxygen into the remote chamber 102 to balance the pressure between the remote chamber 102 and the main combustion chamber 104, to ensure a reliable and fast DDT process. The precise control of the total flow rate into the remote chamber 102 can be realized via various technical paths, such as for instance model-based control based on engine speed and position of the piston 1002.

Additionally or alternatively, rotary valve 220 is closed during the compression stroke to prevent the in-cylinder charge from flowing into the tubing assembly 106. In that case, at the end of the compression stroke, the rotary valve 220 is switched back to the open condition such that the remote chamber 102, the tube 200 of the tubing assembly 106, and the main combustion chamber 104 are in fluid communication with one another.

The sparkplug 704 is then used to create a flame kernel in the remote chamber 102, and the tubing assembly 106 is used to pre-treat the flame during propagation through the tube 200 and cause DDT. The resulting detonation wave then ignites the air/fuel mixture within the main combustion chamber 104, and the products of the combustion process are removed from the system during the exhaust stroke of the piston 1002.

Example 5

Figure 16:
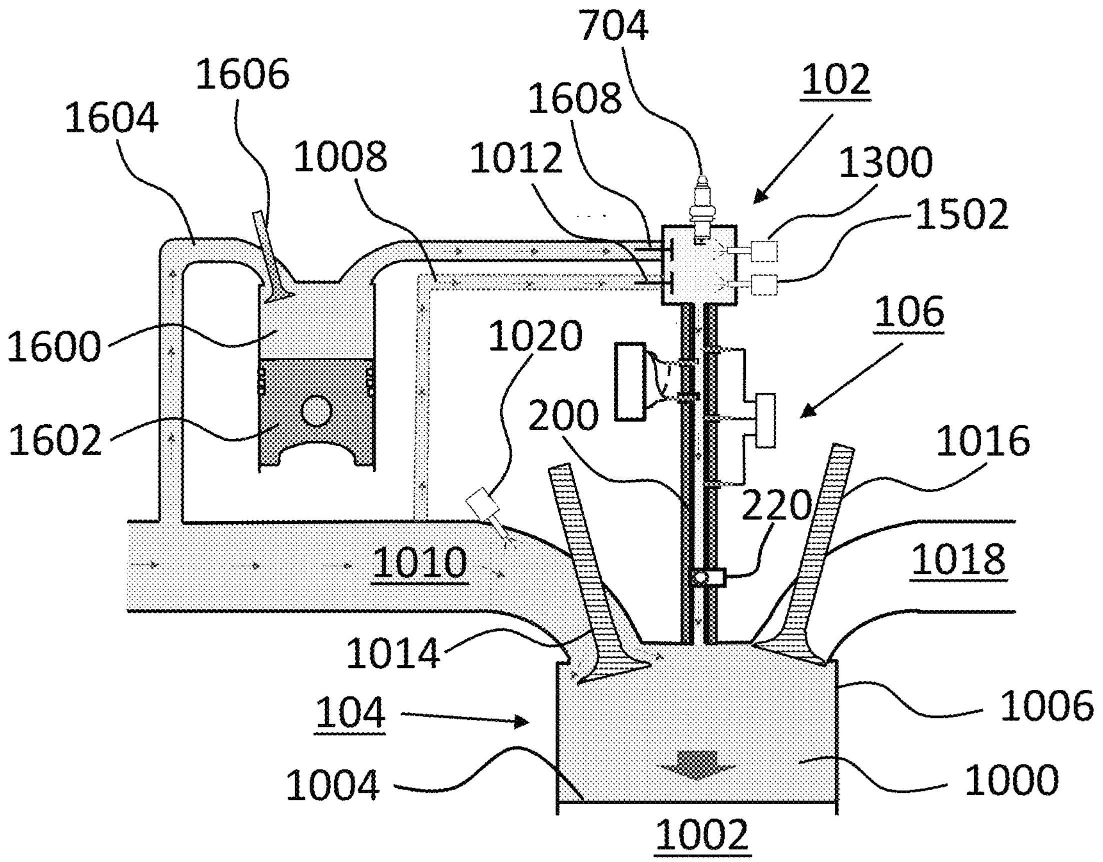
FIG. 16 depicts a portion of an internal combustion engine including a remote chamber ignition system, in accordance with an embodiment.

FIG. 16 depicts a portion of an internal combustion engine including a remote chamber ignition system, in accordance with an embodiment. FIG. 17A-E shows the in-cylinder pressure and the timings of the various valves and injectors in the system of FIG. 16 during an ignition event. As shown in FIG. 16, remote chamber 102 is in fluid communication with main combustion chamber 104 via tubing assembly 106. The main combustion chamber 104 is defined within a cylinder 1000. A piston 1002 having a top surface 1004 is moveably disposed within the cylinder 1000 and sealingly engages with the inner surfaces of the walls 1006 of the cylinder 1000. A gas exchange conduit 1008 extends between engine intake manifold 1010 and gas exchange valve 1012 of remote chamber 102. Also shown in FIG. 16 are sparkplug 704 mounted on remote chamber 102, engine intake valve 1014 between the cylinder 1000 and engine intake manifold 1010, and engine exhaust valve 1016 between the cylinder 1000 and engine exhaust manifold 1018. A main fuel injector 1020 is provided in fluid communication with the engine intake manifold 1010, downstream of the gas exchange conduit 1008.

A second fuel injector 1300 is fluidly coupled to the remote chamber 102 for dynamically adjusting the fuel mixture composition in the remote chamber 102. For instance, the second fuel injector 1300 injects fuel, which may be either the same as or different than fuel that is fed into the main combustion chamber 104. An additional injector 1502 is also fluidly coupled to the remote chamber 102, also for use in dynamically adjusting the fuel mixture composition in the remote chamber 102. For instance, the injector 1502 is used to inject air, or oxygen enriched air, or pure oxygen into the remote chamber 102. Such an arrangement is advantageous when the engine is operating under lean burn or heavily diluted conditions, in order to avoid flame quenching during flame propagation through the tubing assembly 106.

The engine depicted in FIG. 16 further includes an auxiliary compression cylinder 1600 to balance the pressure between the remote chamber 102 and the main combustion chamber 104. The movement of an auxiliary piston 1602 within auxiliary compression cylinder 1600 is synchronized with the piston 1002 within cylinder 1000. A conduit 1604 extends between intake manifold 1010 and valve 1606 at the intake port of the auxiliary compression cylinder 1600. Valve 1606 opens during the intake stroke of the auxiliary piston 1602 to introduce fresh air into the auxiliary compression cylinder 1600. The compression ratio and bore/stroke ratio of the auxiliary compression cylinder 1600 are the same as the corresponding values for the cylinder 1000, allowing the in-cylinder pressure of the auxiliary compression cylinder 1600 to be identical to that of the cylinder 1000 during the compression strokes of the two pistons 1602 and 1002. The displacement of the auxiliary compression cylinder 1600 is preferably smaller than the displacement of the cylinder 1002 to minimize compression and friction losses. In addition, the displacement of the auxiliary compression cylinder 1600 is preferably larger than the volume of the remote chamber 104 and tube 200 of the tubing assembly 106, such that the in-cylinder pressure is not affected when valve 1608 opens.

Figure 17A:
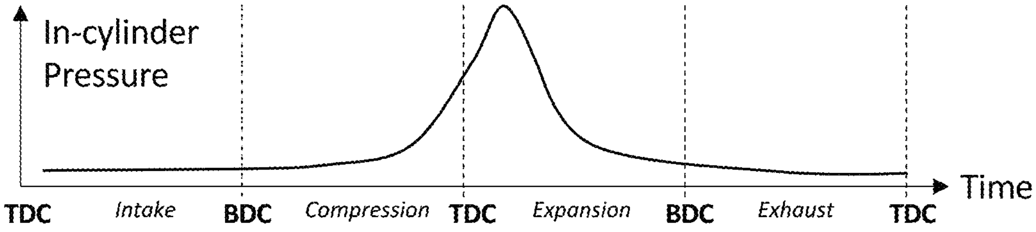
FIG. 17A shows the in-cylinder pressure during an ignition event.
Figure 17B:
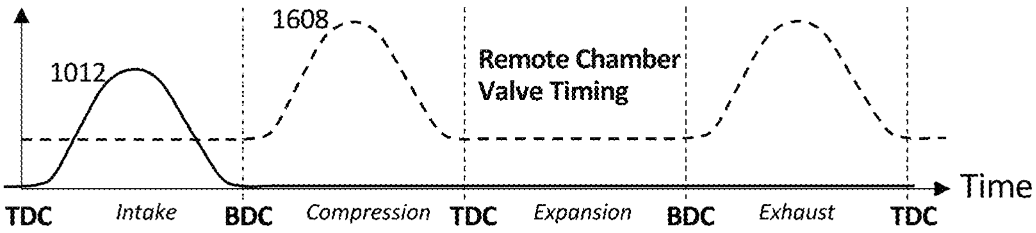
FIG. 17B shows the remote chamber valve timing during an ignition event.
Figure 17C:
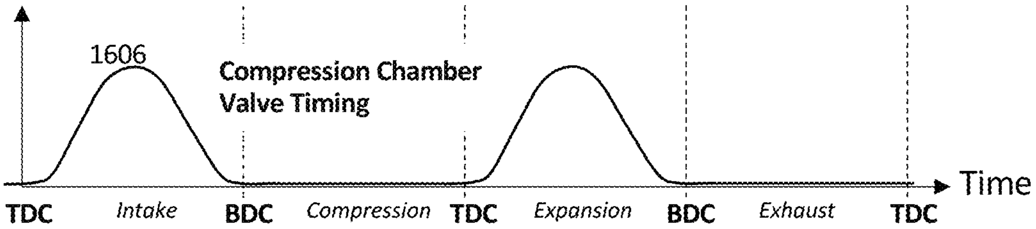
FIG. 17C shows the auxiliary compression cylinder valve timing during an ignition event.
Figure 17D:
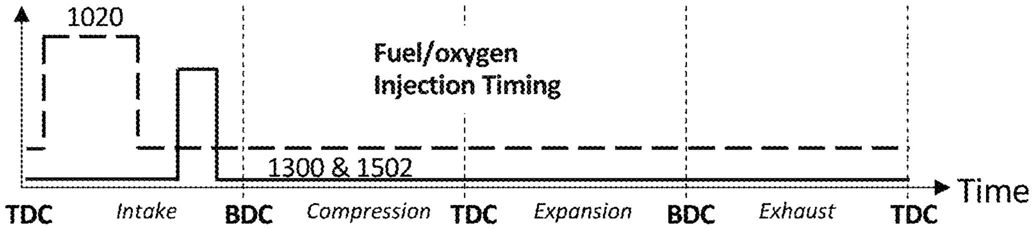
FIG. 17D shows the timings of the main fuel injector and of the additional fuel and/or oxygen injector(s) during an ignition event.
Figure 17E:
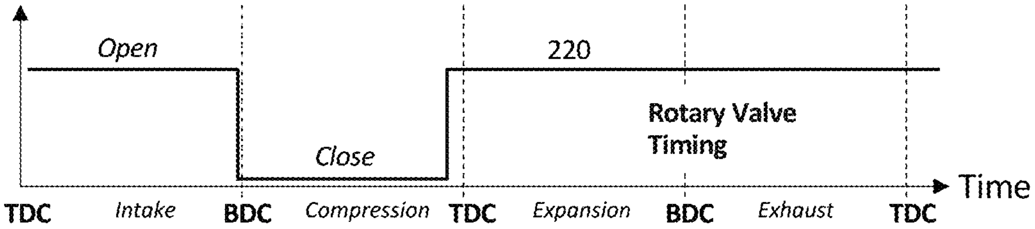
FIG. 17E shows the timing of the rotary valve during an ignition event.

Now referring to FIGS. 17B-E and also to FIG. 16, during the intake stroke of the piston 1002 the gas exchange valve 1012 of remote chamber 102 and the valve 1606 at the intake port of the auxiliary compression cylinder 1600 are both open (as shown in FIGS. 17B and 17C, respectively). In addition, rotary valve 220 is also open (as shown in FIG. 17E). This arrangement of the valves allows fresh air to be drawn into the remote chamber 102 and into the auxiliary compression cylinder 1600. The main fuel injector 1020 injects fuel into the intake manifold 1010 (see FIG. 17D) downstream of conduits 1008 and 1604, thereby charging the main combustion chamber 104 with a first combustible charge gas through opened valve 1014. After the main fuel injector 1020 stops injecting fuel, the second fuel injector 1300 and the injector 1502 inject a fuel and air, or oxygen enriched air, or pure oxygen into the remote chamber 102 (see FIG. 17D), thereby filling the remote chamber 102 with a second combustible charge gas. The rotary valve 220 remains open until the end of the intake stroke or the beginning of the compression stroke, which causes the second combustible charge gas to be drawn into tube 200 of the tubing assembly 106, such that the remote chamber 102 and the tube 200 are filled with a homogeneous combustible gas mixture.

Near the end of the intake stroke or the beginning of the compression stroke, the rotary valve 220 is closed to prevent the first combustible charge gas from the main combustion chamber 104 from mixing with the second combustible charge gas in the tube 200 of the tubing assembly 106. Gas exchange valve 1012 also closes to prevent the second combustible charge gas from flowing out of the remote chamber 102 and into the intake manifold 1010. Prior to the end of the compression stroke, the rotary valve 220 opens again (as shown in FIG. 17E). Since the valve 1606 is also open during the compression stroke, the compressed gas from the auxiliary compression cylinder 1600 acts to balance the pressure between the remote chamber 102 and the main combustion chamber 104, thereby preventing the relatively inert charge gas in the main combustion chamber 104 from flowing into the tubing assembly 106 and remote chamber 102. The relatively higher chemical reactivity gas mixture remains in the tubing assembly 106 for promoting DDT and enhancing the overall ignition process.

The rotary valve 220 remains open during the expansion stroke and the exhaust stroke (as shown in FIG. 17E). Both of the valves 1012 and 1608 of the remote chamber 102 are closed during the expansion stroke. Valve 1606 is open to draw fresh air into the auxiliary compression cylinder 1600. As shown in FIG. 17A, the pressure in cylinder 1000 reaches a maximum value during the expansion stroke of the piston 1002.

Finally, during the exhaust stroke valve 1606 in the intake port of auxiliary compression cylinder 1600 is closed whilst the valve 1608 in the remote chamber 102 is opened. Compressed air from the auxiliary compression cylinder 1600 flows into remote chamber 102 and then through the tubing assembly 106 into the main combustion chamber 104, where it is then expelled via the opened exhaust valve 1016.

As used herein, including in the claims, unless the context indicates otherwise, singular forms of the terms herein are to be construed as including the plural form and vice versa. For instance, unless the context indicates otherwise, a singular reference, such as "a" or "an" means "one or more".

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

What is claimed is:

1. An ignition system for an internal combustion engine having an engine cylinder, the ignition system comprising:

a remote ignition chamber enclosing an ignition source; and a tubing assembly, comprising:

a tube disposed between the remote ignition chamber and a main combustion chamber defined within the engine cylinder, the tube having a central passageway bounded by a wall and defining a flame propagation pathway between the remote ignition chamber and the main combustion chamber:

a plurality of high-voltage electrodes arranged along a length of the tube and extending through the wall of the tube into the central passageway:

a plurality of high-energy discharge sparkplugs arranged along the length of the tube and being mounted through the wall of the tube such that a spark gap of each of the high-energy discharge sparkplugs is positioned within the central passageway; and an electronic controller in electrical communication with the plurality of high-voltage electrodes and in electrical communication with the plurality of high-energy discharge sparkplugs, the electronic controller, in use, for providing first control signals for controlling the plurality of high-voltage electrodes for pretreating a combustible charge gas inside the tube prior to combustion thereof, and the electronic controller, in use, for receiving signals relating to properties of a flame propagating within the tube and sensed using the plurality of high-energy discharge sparkplugs, the signals for use in determining spark timing of at least one sparkplug of the plurality of high-energy discharge sparkplugs for stimulating deflagration-to-detonation transition.

2. The ignition system of claim 1, comprising a temperature control layer at least partially surrounding the tube along at least a portion of the length of the tube for controllably varying a temperature of the wall of the tube during use.

3. The ignition system of claim 1, comprising a first injector in fluid communication with the remote chamber for injecting a fuel into the remote chamber, wherein the injected fuel is a first component of the combustible charge gas.

4. The ignition system of claim 3, comprising a second injector in fluid communication with the remote chamber for injecting a gas comprising molecular oxygen into the remote chamber, wherein the injected gas is a second component of the charge gas.

5. The ignition system of claim 3, comprising a valve disposed proximate an end of the tube that opens into the main combustion chamber, the valve being controllably switchable between an open position allowing fluid flow through the valve and a closed position preventing fluid flow through the valve.

6. The ignition system of claim 1, comprising a high voltage power drive in electrical communication with the plurality of high-voltage electrodes and with the electronic controller, wherein the electronic controller provides the first control signals to the high voltage power drive and the high voltage power drive energizes the plurality of high-voltage electrodes in dependence thereon.

7. The ignition system of claim 1, wherein the sparkplugs of the plurality of sparkplugs comprise:

a first set of two or more spark plugs disposed at a first distance along the length of the tube and circumferentially spaced-apart one from the other, and a second set of two or more spark plugs disposed at a second distance along the length of the tube and circumferentially spaced-apart one from the other.

8. The ignition system of claim 1, wherein sparkplugs of the plurality of sparkplugs are arranged along a spiral path extending along at least a portion of the length of the tube.

9. The ignition system according to claim 1, comprising a gas exchange valve disposed within a gas exchange port that is defined through a wall of the remote ignition chamber, the gas exchange port defining one end of a gas exchange conduit that fluidly connects an intake manifold of the engine to the remote ignition chamber.

10. The ignition system according to claim 9, further comprising an auxiliary compression cylinder fluidly coupled to the remote ignition chamber and fluidly coupled to the intake manifold of the engine, for equalizing pressure in the remote ignition chamber and in the engine cylinder.

11. The ignition system according to claim 10, wherein both the gas exchange conduit and the auxiliary compression cylinder are fluidly coupled to a region of the intake manifold that is upstream of a main fuel injector of the internal combustion engine.

* * * * *